US008819643B1

(12) United States Patent
Ellis et al.

(10) Patent No.: US 8,819,643 B1
(45) Date of Patent: Aug. 26, 2014

(54) PARALLEL PROGRAM PROFILER

(75) Inventors: Edric Ellis, Cambs (GB); Salman Marvasti, Middlesex (GB)

(73) Assignee: The Mathworks, Inc., Natick, MA (US)

( * ) Notice: Subject to any disclaimer, the term of this patent is extended or adjusted under 35 U.S.C. 154(b) by 1436 days.

(21) Appl. No.: 11/860,953

(22) Filed: Sep. 25, 2007

(51) Int. Cl.
*G06F 9/44* (2006.01)
*G06F 11/00* (2006.01)
*G06F 15/16* (2006.01)

(52) U.S. Cl.
USPC .............................. 717/131; 714/46; 709/201

(58) Field of Classification Search
None
See application file for complete search history.

(56) References Cited

U.S. PATENT DOCUMENTS

| | | | | |
|---|---|---|---|---|
| 5,168,554 A * | 12/1992 | Luke | ............................. | 715/209 |
| 5,862,381 A * | 1/1999 | Advani et al. | ................. | 717/125 |
| 5,903,730 A * | 5/1999 | Asai et al. | ...................... | 709/224 |
| 6,049,666 A * | 4/2000 | Bennett et al. | ................. | 717/130 |
| 7,555,549 B1 * | 6/2009 | Campbell et al. | ............. | 709/224 |
| 7,739,667 B2 * | 6/2010 | Callahan et al. | ............... | 717/128 |
| 2002/0080181 A1 * | 6/2002 | Razdow et al. | ................ | 345/772 |
| 2007/0185688 A1 * | 8/2007 | Yamamura et al. | ........... | 702/186 |
| 2007/0294681 A1 * | 12/2007 | Tuck et al. | ..................... | 717/149 |

OTHER PUBLICATIONS

Kim, H., et al., Profiling pMatlab and MatlabMPI Application Using the MATLAB 7 Profiler [online], 2006 [retrieved Mar. 24, 2011], Retrieved from Internet: <http://waybackmachine.org/*/http://www. II.mitedu/pMatlab/files/Profiling_pMatlab_MatlabMPI.pdf>, pp. 1-7.*

The Mathworks Inc., MATLAB the Language of Technical Computing Desktop Tools and Development Environment Version 7 [online], 2004 [retrieved Mar. 24, 2011], Retrieved from Internet: <http://siber.cankaya.edu.tr/ozdogan/NumericalComputations/tutorial/matlab_env.pdf>, entire document (cover—Index-18).*

Gardiner, J., et al., Enhancements to MatlabMPI: Easier Compilation, Collective Communication and Profiling, HPCMP Users Group Conference 2006 [online], Jun. 26-29, 2006 [retrieved Mar. 25, 2011], Retrieved from Internet: <http://ieeexplore.ieee.org/xpls/abs_all.jsp?arnumber=4134093>, pp. 1-5.*

Tau User's Guide, University of Oregon [online], Version 2.15, 2005 [retrieved from Internet Jan. 3, 2013], Retrieved from Internet: <http://web.archive.org/web/20060903005953/http://www.cs.uoregon.edu/research/tau/tau-usersguide.pdf>, pp. 1-246.*

Anonymous, Distributed Computing Toolbox 3 Users Guide, The Mathworks [online], 2007 [retrieved May 2, 2014], Retrieved from Internet: <URL: http://soliton.ae.gatech.edu/classes/ae6382/documents/matlab/mathworks/distcomp_2007b.pdf>, pp. 2-18-2-28.*

Parallel Profiler: Jumpshot; http://www.nottingham.ac.uk/hpc/html/docs/numerical/parallel_jumpshot.php; print date (Sep. 25, 2007); 1 page.

TotalView Debugger: Version 8.2; http://www.totalviewtech.com/index.htm; print date (Sep. 25, 2007) 2 pages.

* cited by examiner

*Primary Examiner* — Don Wong
*Assistant Examiner* — Todd Aguilera
(74) *Attorney, Agent, or Firm* — Harrity & Harrity, LLP

(57) ABSTRACT

A device receives information generated by execution of a parallel program, aggregates the received information, generates one or more performance indicators for the parallel program on one of a line or function basis and based on the aggregated information, and provides the one or more performance indicators to a user.

25 Claims, 16 Drawing Sheets

| Lab: Line Number | Code | Calls | Total Time | Bytes Sent | Bytes Received | Comm Time Wasted (waiting) | Active Comm Time | % Time | Time Plot |
|---|---|---|---|---|---|---|---|---|---|
| 2 : 35 | [z, rnorm] = cgit(A, x); | 15 / 15 | 3.017 s / 3.022 s | 13143.75 Kb / 13142.75 Kb | 13143.75 Kb / 13142.75 Kb | 0.310 s / 0.309 s | 0.136 s / 0.136 s | 56.8% / 56.9% | |
| 2 : 24 | A = 0.5*(A+A'); | 1 / 1 | 0.921 s / 1.282 s | 718.12 Kb / 720.92 Kb | 720.48 Kb / 716.27 Kb | 0.094 s / 0.014 s | 0.209 s / 0.128 s | 17.3% / 24.1% | |
| 2 : 25 | I = speye(n,n,darray); | 1 / 1 | 0.692 s / 0.329 s | 0.78 Kb / 0.78 Kb | 2.08 Kb / 2.08 Kb | 0.344 s / 0.005 s | 0.003 s / 0.003 s | 13.0% / 6.2% | |
| 2 : 23 | A = sprand(n,n,0.5*nz... | 1 / 1 | 0.599 s / 0.601 s | 0.00 Kb / 0.00 Kb | 0.00 Kb / 0.00 Kb | 0 s / 0 s | 0 s / 0 s | 11.3% / 11.3% | |
| 2 : 29 | A = A – lambda*I; | 1 / 1 | 0.065 s / 0.060 s | 0.00 Kb / 0.00 Kb | 0.00 Kb / 0.00 Kb | 0 s / 0 s | 0 s / 0 s | 1.2% / 1.1% | |
| All other lines | | | 0.019 s | 0.00 Kb | 0.00 Kb | 0 s | 0 s | 0.4% | |
| Totals | | | 5.313 s | 13862.66 Kb | 13868.31 Kb | 0.749 s | 0.348 s | 100% | |

700
705 755 710 715 720 725 730 735 740 745 750

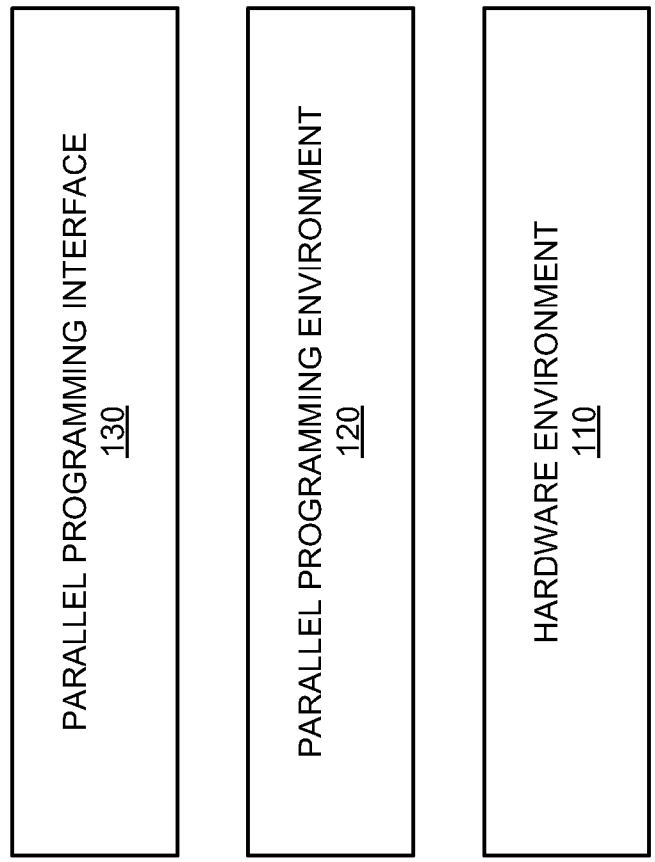

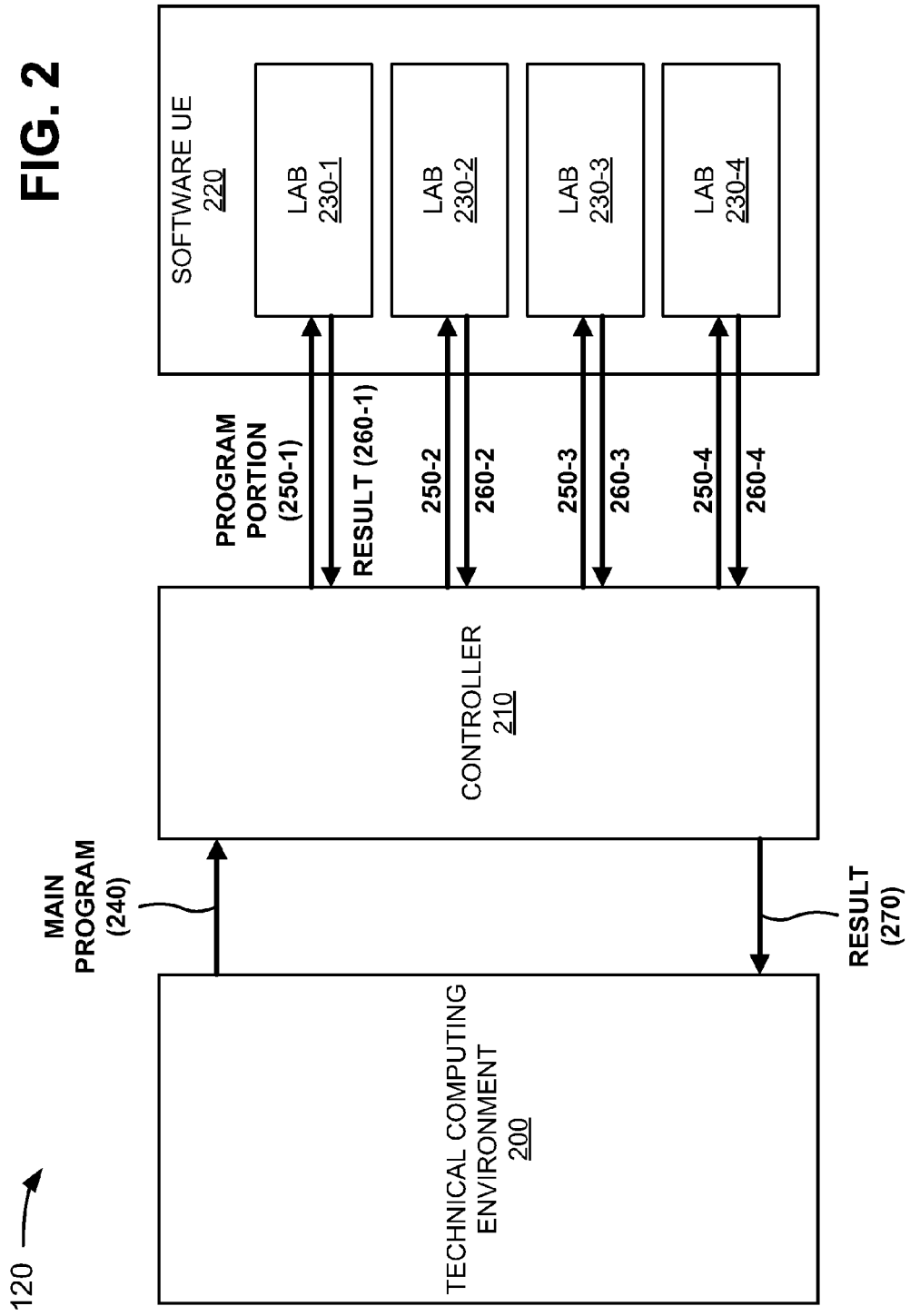

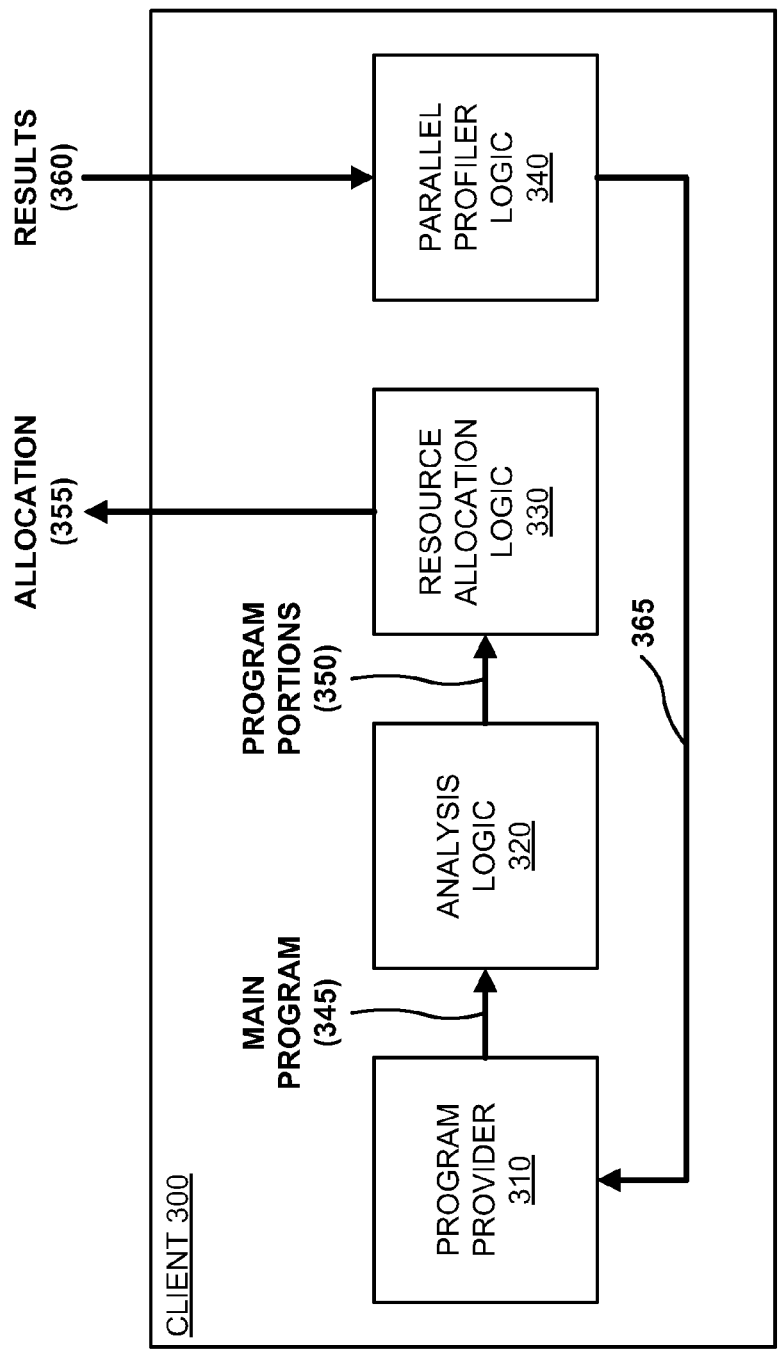

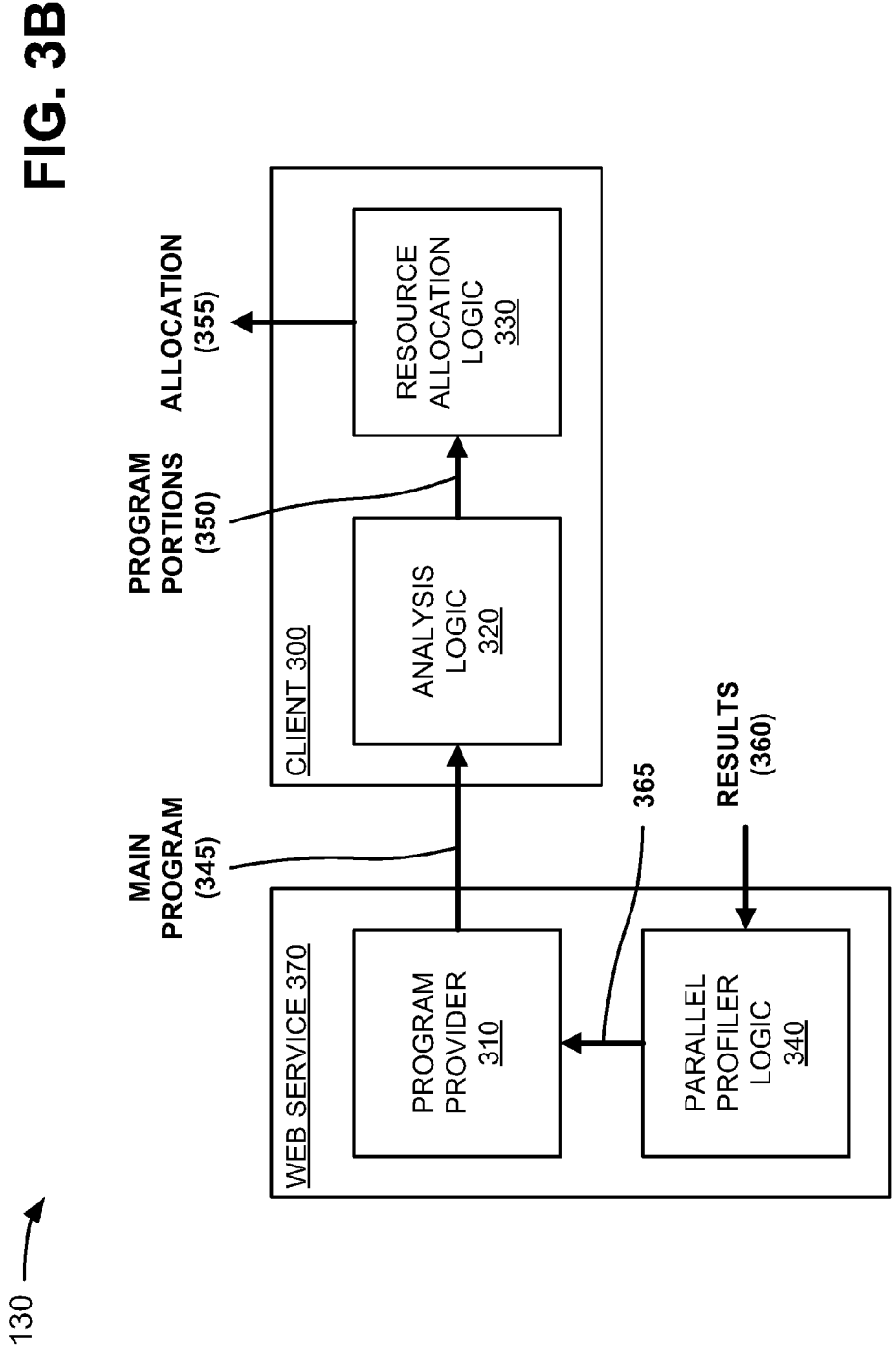

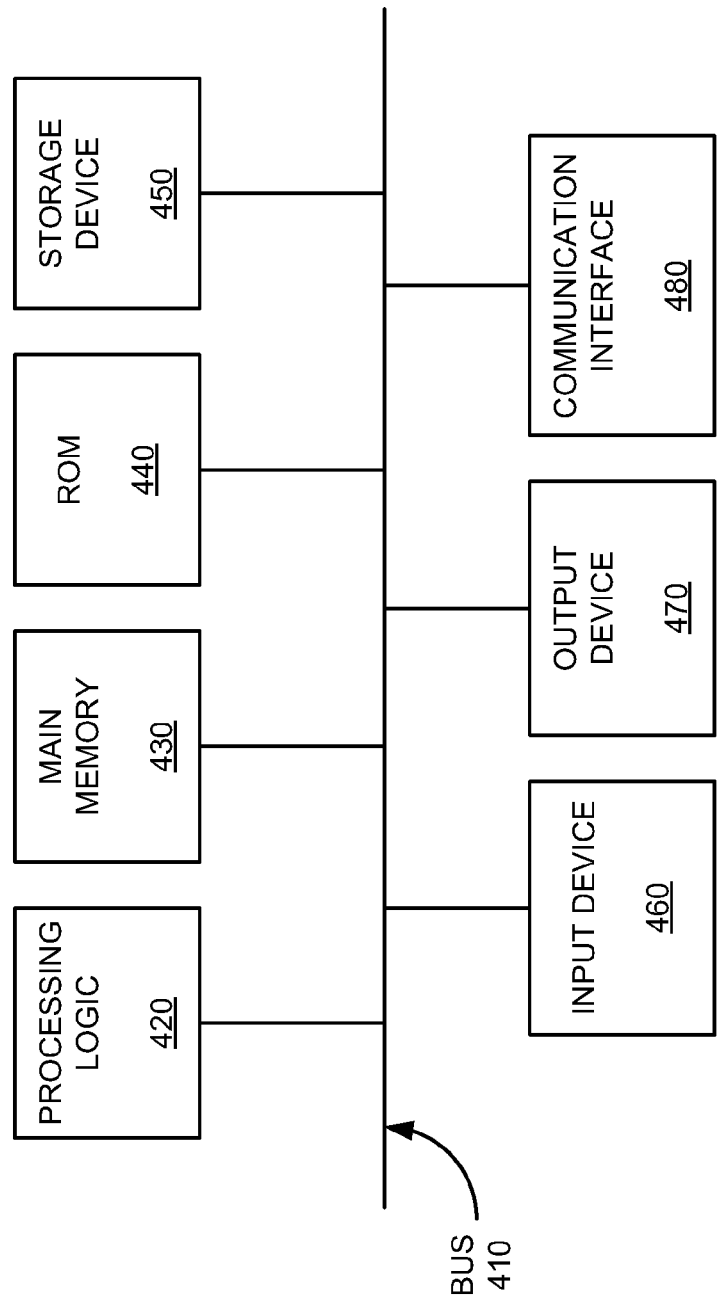

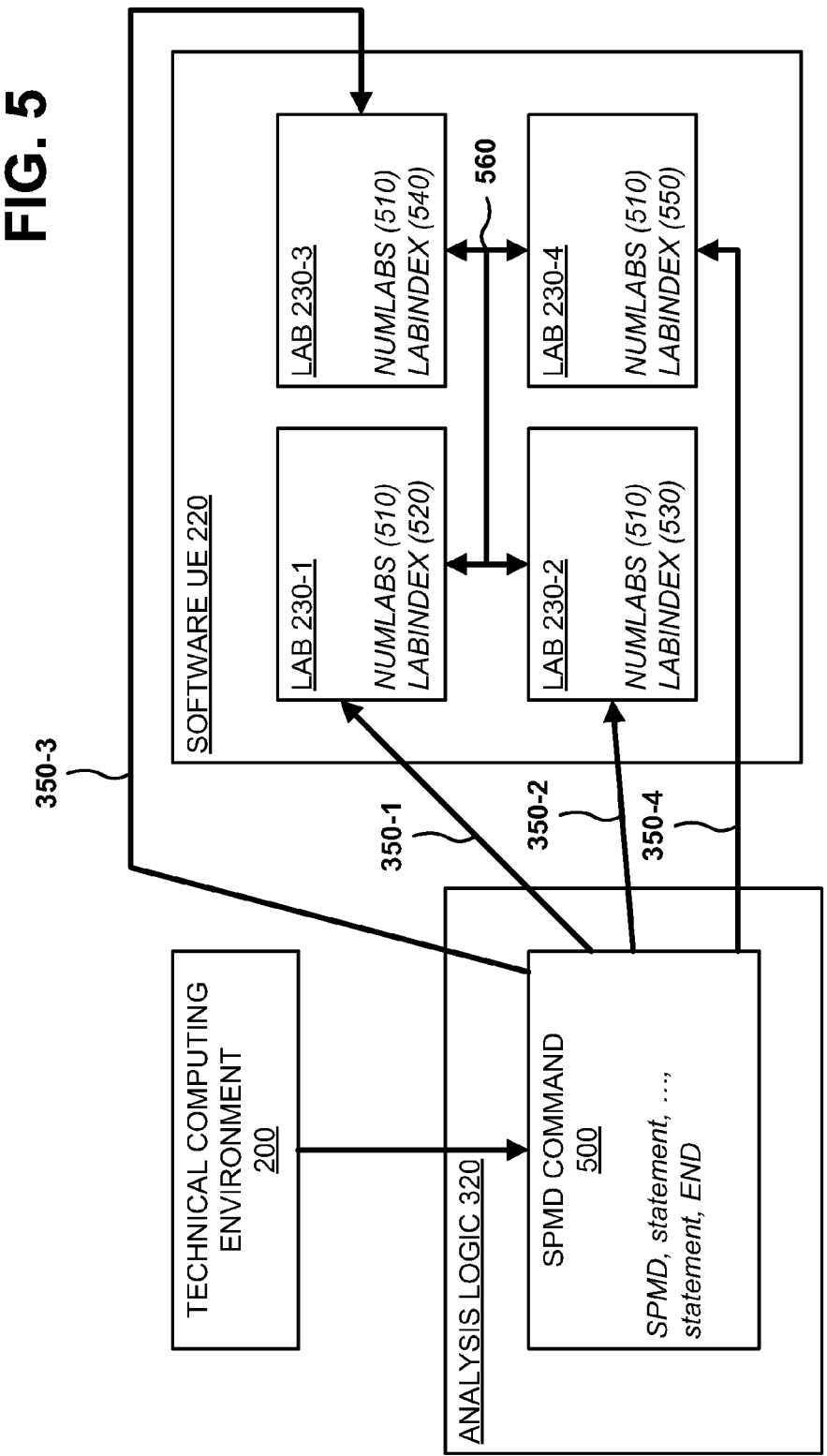

FIG. 7

| Lab: Line Number | Code | Calls | Total Time | Bytes Sent | Bytes Received | Comm Time Wasted (waiting) | Active Comm Time | % Time | Time Plot |
|---|---|---|---|---|---|---|---|---|---|
| 2 : 35 | [z, rnorm] = cgit(A, x); | 15<br>15 | 3.017 s<br>3.022 s | 13143.75 Kb<br>13142.75 Kb | 13143.75 Kb<br>13142.75 Kb | 0.310 s<br>0.309 s | 0.136 s<br>0.136 s | 56.8%<br>56.9% | |
| 2 : 24 | A = 0.5*(A+A'); | 1<br>1 | 0.921 s<br>1.282 s | 718.12 Kb<br>720.92 Kb | 720.48 Kb<br>716.27 Kb | 0.094 s<br>0.014 s | 0.209 s<br>0.128 s | 17.3%<br>24.1% | |
| 2 : 25 | I = speye(n,n,darray); | 1<br>1 | 0.692 s<br>0.329 s | 0.78 Kb<br>0.78 Kb | 2.08 Kb<br>2.08 Kb | 0.344 s<br>0.005 s | 0.003 s<br>0.003 s | 13.0%<br>6.2% | |
| 2 : 23 | A = sprand(n,n,0.5*nz... | 1<br>1 | 0.599 s<br>0.601 s | 0.00 Kb<br>0.00 Kb | 0.00 Kb<br>0.00 Kb | 0 s<br>0 s | 0 s<br>0 s | 11.3%<br>11.3% | |
| 2 : 29 | A = A – lambda*I; | 1<br>1 | 0.065 s<br>0.060 s | 0.00 Kb<br>0.00 Kb | 0.00 Kb<br>0.00 Kb | 0 s<br>0 s | 0 s<br>0 s | 1.2%<br>1.1% | |
| All other lines | | | 0.019 s | 0.00 Kb | 0.00 Kb | 0 s | 0 s | 0.4% | |
| Totals | | | 5.313 s | 13862.66 Kb | 13866.31 Kb | 0.749 s | 0.348 s | 100% | |

FIG. 8
| Lab: Line Number | Code | Calls | Comm Time Wasted (waiting) | Active Comm Time | Bytes Sent | Bytes Received | Total Time | % Wasted Comm Time | Wasted Comm Time Plot |
|---|---|---|---|---|---|---|---|---|---|
| 2 : 25 | I = speye(n,n,darray); | 1<br>1 | 0.344 s<br>0.005 s | 0.003 s<br>0.003 s | 0.78 Kb<br>0.78 Kb | 2.08 Kb<br>2.08 Kb | 0.692 s<br>0.329 s | 46.0%<br>1.6% |  |
| 2 : 35 | [z, rnorm] = cgit(A, x); | 15<br>15 | 0.310 s<br>0.309 s | 0.136 s<br>0.136 s | 13143.75 Kb<br>13142.75 Kb | 13143.75 Kb<br>13142.75 Kb | 3.017 s<br>3.022 s | 41.5%<br>94.2% |  |
| 2 : 24 | A = 0.5*(A+A'); | 1<br>1 | 0.094 s<br>0.014 s | 0.209 s<br>0.128 s | 718.12 Kb<br>720.92 Kb | 720.48 Kb<br>716.27 Kb | 0.921 s<br>1.282 s | 12.5%<br>4.1% |  |

FIG. 9

| Lab: Line Number | Code | Calls | Total Time | Bytes Sent | Bytes Received | Comm Time Wasted (waiting) | Active Comm Time | % Time | Time Plot |
|---|---|---|---|---|---|---|---|---|---|
| 1(3) : 75 | receiveWithErrorHand... | 488 / 244 | 0.683 s / 0.561 s | 0.00 Kb / 0.00 Kb | 26289.08 Kb / 13144.53 Kb | 0.396 s / 0.382 s | 0.121 s / 0.078 s | 63.2% / 49.3% | |
| 1(3) : 127 | labsend(x,curLab+tree... | 488 / 244 | 0.129 s / 0.065 s | 26289.16 Kb / 13144.58 Kb | 0.00 Kb / 0.00 Kb | 0 s / 0 s | 0.104 s / 0.050 s | 11.9% / 5.7% | |
| 1(3) : 50 | curLab = labindex; | 244 / 244 | 0.059 s / 0.055 s | 0.00 Kb / 0.00 Kb | 0.00 Kb / 0.00 Kb | 0 s / 0 s | 0 s / 0 s | 5.5% / 4.8% | |
| 1(3) : 31 | if isdarray(x); | 244 / 244 | 0.032 s / 0.029 s | 0.00 Kb / 0.00 Kb | 0.00 Kb / 0.00 Kb | 0 s / 0 s | 0 s / 0 s | 3.0% / 2.5% | |
| 1(3) : 25 | error(nargchk(2,3,... | 244 / 244 | 0.022 s / 0.035 s | 0.00 Kb / 0.00 Kb | 0.00 Kb / 0.00 Kb | 0 s / 0 s | 0 s / 0 s | 2.0% / 3.1% | |
| 1(3) : 129 | x = labReceive(curLab... | 0 / 244 | 0 s / 0.122 s | 0.00 Kb / 0.00 Kb | 0.00 Kb / 13144.58 Kb | 0 s / 0.078 s | 0 s / 0.049 s | 0% / 10.7% | |
| 1(3) : 71 | labSend(x, curLab... | 0 / 244 | 0 s / 0.075 s | 0.00 Kb / 13144.55 Kb | 0.00 Kb / 0.00 Kb | 0 s / 0 s | 0 s / 0.059 s | 0% / 6.6% | |
| All other lines | | | 0.156 s | 0.00 Kb | 0.00 Kb | 0 s | 0 s | 14.4% | |
| Totals | | | 1.081 s | 26289.16 Kb | 26289.08 Kb | 0.396 s | 0.225 s | 100% | |

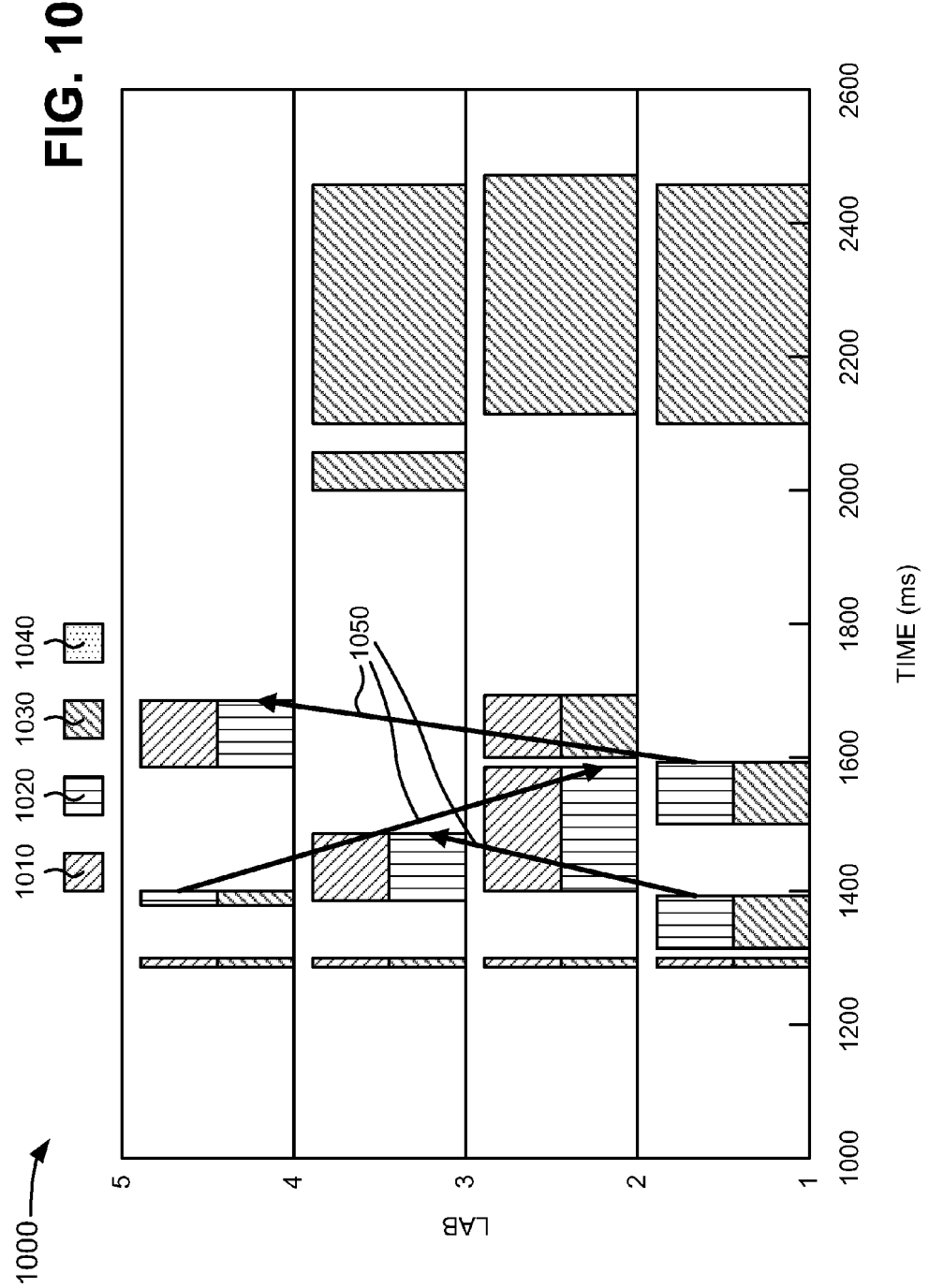

FIG. 11

| time | calls | (sent/rec/wasted) | Line | |
|---|---|---|---|---|
| | | | 1 | Non-code line ⎫ |
| | | | 2 | Non-code line ⎬ 1130 |
| | | | 3 | Non-code line ⎭ |
| < 0.01 | 1 | | 4 | Code line that did run ⎫ 1140 |
| < 0.01 | 1 | | 5 | Code line that did run ⎭ |
| | | | 6 | *Code line that did not run* ⎫ 1150 |
| | | | 7 | *Code line that did not run* ⎭ |
| 0.94 | 1 | 716k/718k/0.214 s | 8 | Code line that did run ⎫ |
| 0.68 | 1 | 4.16k/1.58k/0.343 s | 9 | Code line that did run ⎬ 1160 |
| 3.01 | 1 | 25.7m/25.7m/0.0529 s | 10 | Code line that did run ⎭ |

FUNCTION CODE LISTING (1120)

| | |
|---|---|
| Total lines in function | 39 |
| Non-code lines (comments, blank lines) | 14 |
| Code lines (lines that can run) | 25 |
| Code lines that did run | 17 |
| Code lines that did not run | 8 |
| Coverage (did run/can run) | 68.00% |

COVERAGE RESULTS (1110)

1100

PARALLEL PROGRAM PROFILER

BACKGROUND

Closely-coupled processors or hardware resources will become widely available within the near future. Examples of such closely-coupled processors (or hardware resources) may include additional processors, threads in a particular processor, additional cores in a central processing unit, additional processors mounted on the same substrate or board, and/or such devices provided within computers connected by a network fabric into a cluster, a grid, or a collection of resources.

Certain computations (e.g., parallel processing or parallel programming) may benefit from the availability of such hardware resources. For example, a complex simulation may run faster if the simulation is divided into portions and the portions are simultaneously run on a number of processing devices in a parallel fashion. Parallel computing arrangements may include a controller that determines how an application should be divided and what application portions go to which parallel processors. For example, a host computer that is running a simulation may act as the controller for a number of parallel processors. Parallel processors may receive instructions and/or data from the controller and may return a result to the controller.

Some serial programs include profiler infrastructures that collect statistics and other information about the execution of the serial program. The statistics may be used to detect performance problems associated with the serial program. In contrast, it may be difficult to locate where a performance bottleneck or algorithm deficiency occurs in a parallel program because there can be many more dimensions of data to collect.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 1 is an exemplary diagram of an architectural overview in which implementations described herein may be practiced;

FIG. 2 is an exemplary diagram of a parallel programming environment of FIG. 1;

FIG. 3A is an exemplary diagram of functional components of a parallel programming interface depicted in FIG. 1;

FIG. 3B is an exemplary diagram of functional components of the parallel programming interface in an alternative arrangement;

FIG. 4 illustrates exemplary hardware components of a client and/or a web service depicted in FIGS. 3A-3C;

FIG. 5 illustrates an exemplary parallel programming construct capable of being analyzed and transformed to parallel program portions by analysis logic depicted in FIGS. 3A and 3B;

FIGS. 7-11 illustrate exemplary user interfaces associated with the parallel profiler logic depicted in FIG. 6.

DETAILED DESCRIPTION

Figure 3C:
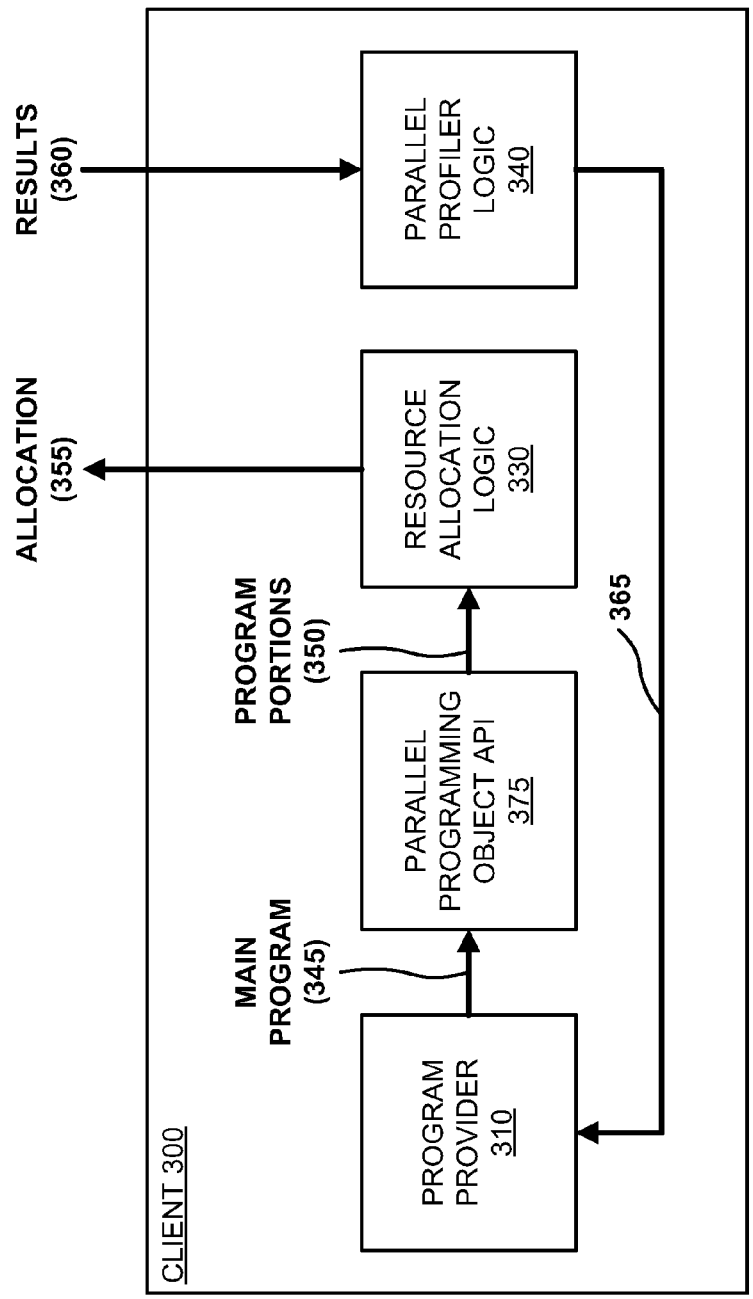
FIG. 3C is an exemplary diagram of functional components of the parallel programming interface in another alternative arrangement.

The following detailed description refers to the accompanying drawings. The same reference numbers in different drawings may identify the same or similar elements. Also, the following detailed description does not limit the invention.

Overview

Implementations described herein may include a profiler for a parallel program that provides information for optimizing execution of the parallel program. For example, in one implementation, one or more portions of the parallel program may be dynamically allocated to one or more software units of execution (UEs), and/or the one or more software UEs may be forwarded to one or more hardware UEs for execution. The parallel program profiler may receive information generated during execution of the parallel program, may aggregate the received information, and/or may generate performance indicators based on the aggregated information.

A "hardware unit of execution," as the term is used herein, is to be broadly interpreted to include a device (e.g., a hardware resource) that performs and/or participates in parallel programming activities. For example, a hardware unit of execution may perform and/or participate in parallel programming activities in response to a request and/or a task received from a client. A hardware unit of execution may perform and/or participate in substantially any type of parallel programming (e.g., task, data, and/or stream processing) using one or more devices. For example, in one implementation, a hardware unit of execution may include a single processing device that includes multiple cores and in another implementation, the hardware unit of execution may include a number of processors. Devices used in a hardware unit of execution may be arranged in substantially any configuration (or topology), such as a grid, ring, star, etc. A hardware unit of execution may support one or more threads (or processes) when performing processing operations.

A "software unit of execution," as the term is used herein, is to be broadly interpreted to include a software resource (e.g., a worker, a lab (e.g., a smaller scale software unit of execution), etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. A software unit of execution may support one or more threads (or processes) when performing processing operations.

"Parallel programming" and/or "parallel program," as the terms are used herein, are to be broadly interpreted to include any type of processing that can be distributed across two or more resources (e.g., software units of execution, hardware units of execution, processors, microprocessors, clusters, labs, etc.) and be performed at substantially the same time. For example, in one implementation, parallel programming may refer to task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task). In another implementation, parallel programming may refer to data parallel programming, where data (e.g., a data set) is parsed into a number of portions that are executed in parallel using two or more software units of execution. In data parallel programming, the software units of execution and/or the data portions may communicate with each other as processing progresses. In still another implementation, parallel programming may refer to stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays). Other implementations may combine two or more of task, data, or stream parallel programming techniques alone or with other types of processing techniques to form hybrid-parallel programming techniques.

A "parallel programming environment," as the term is used herein, is to be broadly interpreted to include any environment capable of performing parallel programming. For example, a parallel programming environment may include a dynamic number of processes provided on one or more hardware and/or software units of execution which may have several different control and data passing layers through which a current behavior of a part or a whole of the environment may be specified. In one implementation, a front-end application (e.g., a parallel programming interface) may interface with the parallel programming environment to provide one or more users with access to the parallel programming environment. In another implementation, the processes involved in the parallel programming environment may include processes associated with a technical computing environment.

A "technical computing environment (TCE)," as the term is used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically-typed programming language (e.g., the MATLAB® M language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel programming, etc.). In another implementation, a TCE may provide these functions as block sets. In still another implementation, a TCE may provide these functions in another way, such as via a library, etc.

A TCE may be implemented as a text-based environment (e.g., MATLAB®; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Exemplary Architectural Overview

FIG. 1 is an exemplary diagram of an architectural overview 100 in which implementations described herein may be practiced. As illustrated, overview 100 may include a hardware environment 110, a parallel programming environment 120, and/or a parallel programming interface 130.

Hardware environment 110 may include one or more hardware resources that may be used to perform parallel programming. For example, in one implementation, hardware environment 110 may include one or more hardware units of execution (UEs), and/or each hardware UE may include one or more processors. The processors may include any type of processing device, such as a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, a reduced instruction processor, etc. In one implementation, each processor may include a single core processor or a multi-core processor. In another implementation, each processor may include a single processing device or a group of processing devices, such as a processor cluster or a computing grid. In still another implementation, each processor may include multiple processors that may be local or remote with respect each other, and may use one or more threads while processing. In a further implementation, each processor may represent a single hardware UE.

Parallel programming environment 120 may provide parallel programming for a main program. For example, in one implementation, parallel programming environment 120 may include a technical computing environment that provides a main program to a controller. The controller may provide portions of the program to one or more software units of execution. The software units of execution may execute the program portions, and may provide results to the controller. The controller may combine the results into a single result, and may provide the single result to the technical computing environment. Further details of parallel programming environment 120 are provided below in connection with FIG. 2.

Parallel programming interface 130 may include a frontend application (e.g., an application program interface (API)) that provides an interface for statically or dynamically accessing, controlling, utilizing, etc. hardware environment 110 and/or parallel programming environment 120. For example, in one implementation, parallel programming interface 130 may be in the form of parallel programming constructs that permit users to express specific parallel workflows. In such an implementation, parallel programming interface 130 may include a program provider that provides a main program to analysis logic. The analysis logic may analyze the main program, may parse the main program into program portions, and may provide the program portions to resource allocation logic. Resource allocation logic may allocate the program portions to one or more software units of execution and/or hardware units of execution. The program portions may be executed, and results may be provided to the program provider. In another implementation, parallel programming interface 130 may include an object API where a user may specify how a program may be parallelized. Further details of parallel programming interface 130 are provided below in connection with FIGS. 3A-3C.

Although FIG. 1 shows exemplary components of architectural overview 100, in other implementations, architectural overview 100 may contain fewer, different, or additional components than depicted in FIG. 1. Moreover, one or more components of architectural overview 100 may perform one or more acts described as performed by one or more other components of architectural overview 100.

Exemplary Parallel Programming Environment

FIG. 2 is an exemplary diagram of parallel programming environment 120. As illustrated, parallel programming environment 120 may include a technical computing environment 200, a controller 210, and a software unit of execution 220. Technical computing environment 200 may include any of the features described above in the definition of the term "technical computing environment."

Controller 210 may include hardware and/or software based logic to perform controlling operations on behalf of a software program. For example, in one implementation, controller 210 may select and/or control parallel programming activities performed by software UE 220 on behalf of technical computing environment 200.

Software unit of execution (UE) 220 may include any of the features described above in the definition of the term "software unit of execution." In one implementation, software UE 220 may include one or more labs (e.g., labs 230-1, 230-2, 230-3, and 230-4, collectively referred to as "labs 230"). A "lab," as the term is used herein, is to be broadly interpreted to include a software resource that performs and/or participates in parallel programming activities. For example, a lab may perform and/or participate in parallel programming activities in response to a receipt of one or more portions of the program. In one implementation, a lab may be similar to a software unit of execution, except on a smaller scale. In other implementations, a lab may represent a single software unit of execution.

In an exemplary operation, technical computing environment 200 may provide a main program 240 to controller 210. Controller 210 may provide portions of program 240 (e.g., program portions 250-1, 250-2, 250-3, and 250-4, collectively referred to as "program portions 250") to labs 230-1, 230-2, 230-3, and 230-4, respectively, of software UE 220. Labs 230 may execute program portions 250, and may provide results to controller 210. Labs 230 may receive data to use in executing program portions 250. For example, lab 230-1 may provide a result 260-1 to controller 210, lab 230-2 may provide a result 260-2 to controller 210, lab 230-3 may provide a result 260-3 to controller 210, and lab 230-4 may provide a result 260-4 to controller 210. Controller 210 may combine the results into a single result 270, and may provide single result 270 to technical computing environment 200.

Although FIG. 2 shows exemplary components of parallel programming environment 120, in other implementations, parallel programming environment 120 may contain fewer, different, or additional components than depicted in FIG. 2. In still other implementations, one or more components of parallel programming environment 120 may perform one or more tasks described as performed by one or more other components of parallel programming environment 120.

Exemplary Parallel Programming Interfaces

FIG. 3A is an exemplary diagram of functional components of parallel programming interface 130. As illustrated, parallel programming interface 130 may include a client 300 that includes a variety of functional components, such as a program provider 310, analysis logic 320, resource allocation logic 330, and/or parallel profiler logic 340.

Client 300 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 300 may include a device capable of providing a parallel programming interface, as described herein. Although not shown in FIG. 3A, client 300 may include a technical computing environment (e.g., TCE 200). Other implementations of client 300 may contain fewer, different, or additional components than depicted in FIG. 3A.

Program provider 310 may include hardware and/or software based logic that provides one or more programs for execution. For example, in one implementation, program provider 310 may generate programs created using a technical computing environment, as defined above. As shown in FIG. 3A, program provider 310 may provide a main program 345 to analysis logic 320.

Analysis logic 320 may receive main program 345, and may include hardware and/or software based logic that analyzes main program 345 and parses main program 345 into one or more program portions 350. In one implementation, analysis logic 320 may include language constructs (as described below in connection with FIG. 5) that parse main program 345 into one or more program portions 350. As shown in FIG. 3A, analysis logic 320 may provide program portions 350 to resource allocation logic 330. In another implementation, analysis logic 350 may provide multiple copies of main program 345 (e.g., instead of program portions 350) to resource allocation logic 330. Further details of analysis logic 320 are provided below in connection with FIG. 5.

Resource allocation logic 330 may receive program portions 350, and may include hardware and/or software based logic that dynamically allocates (as indicated by reference number 355) program portions 350 to one or more software UEs (e.g., software UE 220) for parallel execution. Although not shown in FIG. 3A, allocation 355 may be provided to one or more software UEs, and the software UEs may be executed by one or more hardware UEs in a parallel programming manner. Alternatively and/or additionally, if no external resources (e.g., external software UEs or external hardware UEs) are available, allocation 355 may be executed via software UEs and/or hardware UEs of client 300. The software UEs may return results 360 of the execution of program portions 350 (or multiple copies of main program 345) to parallel profiler logic 340.

Parallel profiler logic 340 may include hardware and/or software based logic that receives results 360 from the software UEs, and provides statistical information and/or data for display 365 (hereinafter referred to as "display data 365"), based on results 360, to program provider 310. In one implementation, parallel profiler logic 340 may combine results 360 into a single result, and may provide the single result to program provider 310. Further details of parallel profiler logic 340 are provided below in connection with FIG. 6.

Client 300 (e.g., via analysis logic 320) may define a sub-group behavior for each of program portions 350. A "sub-group," as the term is used herein, may be broadly defined to include any part of the overall set of processes (e.g., main program 345 and/or program portions 350). For example, the sub-group behavior may relate to the parallel programming styles that may be employed on the group of program portions 350. However, client 300 may dynamically change the behavior of one or more of program portions 350 as code is executed for other program portions 350. In one implementation, client 300 may use the control layer to change the current state of a sub-group at any time, which may dynamically change the behavior of that portion of the group. For example, an application (e.g., main program 345) may include different phases (e.g., an input phase, an analysis phase, an output phase, etc.), and parallel programming needs may be different for each phase.

In one implementation, the sub-group behavior may include an unused state (e.g., the initial state of a process when it is not being used), a user-controlled UE state (e.g., if a user has acquired a process as a UE object), a task parallel state (e.g., an execution state used by parallel programming constructs), a single program, multiple data (SPMD) state (e.g., one or more processes may have a message passing interface (MPI) ring between them with appropriate values for rank and size), a stream state (e.g., a state where task allocation may be expressed in a directed acyclic graph (DAG) or a cyclic graph with delays), etc. Each of program portions 350 may be in one of the above-mentioned states, and may request other tasks to be placed in a new state.

In another implementation, client 300 may be interactive in that resource allocation logic 330 may permit a user to dynamically control a current setup (e.g., via scripts, functions, command lines, etc.). Thus, client 300 and its configuration may change based on an actual analysis that the user may be currently undertaking. In another implementation, resource allocation logic 330 may be connected to one or more clusters of software UEs 220 and may use processes derived from each of the clusters, as well as client 300, to form the functional components of client 300. In still another implementation, client 300 may include devices having different architectures and/or operating systems (OSs) (i.e., client 300 may execute across multiple platforms). For example, client 300 may include a different architecture and/or OS than software UE 220.

In one exemplary implementation, main program 345 may be submitted in a batch manner to a cluster (e.g., a cluster of software UEs 220 and/or a cluster of labs 230). For example, a user may interactively develop main program 345, and may save main program 345 in a file (e.g., an M file). A command may exist in main program 345 (e.g., in the M file) that may cause one lab (e.g., one of labs 230) in the cluster to act as a client where the execution of main program 345 initiates. Main program 345, for example, may use four labs 230 and a client (e.g., one of labs 230 acting as a client), may initiate on the client, and may utilize as many labs 230 as necessary to carry out execution. In another example, a special type of job may be created that creates a pool (or cluster) of labs, where one of the initiated processes of the job may act as the client, and rest of processes may be in the pool.

FIG. 3B is an exemplary diagram of functional components of parallel programming interface 130 in an alternative arrangement. The alternative arrangement depicted in FIG. 3B is the same as the arrangement of FIG. 3A, except that program provider 310 and/or parallel profiler logic 340 may be included in a web service 370, while analysis logic 320 and/or resource allocation logic 330 may be included in client 300. Program provider 310, analysis logic 320, resource allocation logic 330, and/or parallel profiler logic 340 may operate in the manner as described above in connection with FIG. 3A.

Web service 370 may provide access to one or more programs (e.g., main program 345) provided by program provider 310, applications accessed by main program 345, one or more applications provided by parallel profiler logic 340, etc. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., client 300) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one exemplary implementation, web service 370 may allow a destination (e.g., a computer operated by a customer) to perform parallel programming and/or parallel profiling (e.g., via parallel profiler logic 340) using hardware and/or software UEs that may be operated by a service provider (e.g., client 300). For example, the customer may be permitted access to client 300 to perform parallel programming and/or parallel profiling if the customer subscribes to one of the offered web services. The service provider may maintain a database that includes parameters, such as parameters that indicate the status of hardware UEs, software UEs, etc. The service provider may perform a look-up operation in the database if a request for parallel programming and/or parallel profiling is received from the customer. The service provider may connect the customer to parallel programming and/or parallel profiling resources that are available based on parameters in the database.

In another exemplary implementation, the customer may receive web service 370 on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of hardware UEs, software UEs, etc., used by the customer, etc.

FIG. 3C is an exemplary diagram of functional components of parallel programming interface 130 in another alternative arrangement. The alternative arrangement depicted in FIG. 3C is the same as the arrangement of FIG. 3A, except that analysis logic 320 may be replaced with a parallel programming object API 375. Program provider 310, resource allocation logic 330, and/or parallel profiler logic 340 may operate in the manner as described above in connection with FIG. 3A.

Parallel programming object API 375 may permit a user to specify how main program 345 may be broken into portions that may be executed in parallel. Parallel programming object API 375 may cooperate with resource allocation logic 330 and/or an execution mechanism (e.g., one or more software UEs 220) in a similar manner that analysis logic 320 cooperates with these components. However, parallel programming object API 375 may offer more flexibility and/or customization. In one implementation, parallel programming interface object API 375 (e.g., a code-based interface) may define and implement an object in a technical computing environment (e.g., TCE 200) that corresponds to another one or more (or set of) executing technical computing environments. Parallel programming object API 375 may permit customizable parallelism of a program (e.g., main program 345), and may be nested in other calls or function (e.g., in the parallel programming construct described below in connection with FIG. 5).

Although FIGS. 3A-3C show exemplary components of parallel programming interface 130, in other implementations, parallel programming interface 130 may contain fewer, different, or additional components than depicted in FIGS. 3A-3C. In still other implementations, one or more components of parallel programming interface 130 may perform one or more tasks described as being performed by one or more other components of parallel programming interface 130.

Exemplary Client/Web Service Architecture

FIG. 4 is an exemplary diagram of an entity corresponding to client 300 and/or web service 370. As illustrated, the entity may include a bus 410, processing logic 420, a main memory 430, a read-only memory (ROM) 440, a storage device 450, an input device 460, an output device 470, and/or a communication interface 480. Bus 410 may include a path that permits communication among the components of the entity.

Processing logic 420 may include a processor, microprocessor, or other types of processing logic that may interpret and execute instructions. In one implementation, processing logic 420 may include a single core processor or a multi-core processor. In another implementation, processing logic 420 may include a single processing device or a group of processing devices, such as a processor cluster or computing grid. In still another implementation, processing logic 420 may include multiple processors that may be local or remote with respect each other, and may use one or more threads while processing. In a further implementation, processing logic 420 may include multiple processors implemented as hardware UEs capable of running copies of a technical computing environment.

Main memory 430 may include a random access memory (RAM) or another type of dynamic storage device that may store information and instructions for execution by processing logic 420. ROM 440 may include a ROM device or another type of static storage device that may store static information and/or instructions for use by processing logic 420. Storage device 450 may include a magnetic and/or optical recording medium and its corresponding drive, or another type of static storage device (e.g., a disk drive) that may store static information and/or instructions for use by processing logic 420.

Input device 460 may include a mechanism that permits an operator to input information to the entity, such as a keyboard, a mouse, a pen, a microphone, voice recognition and/or biometric mechanisms, etc. Output device 470 may include a mechanism that outputs information to the operator, including a display, a printer, a speaker, etc. Communication interface 480 may include any transceiver-like mechanism that enables the entity to communicate with other devices and/or systems. For example, communication interface 480 may include mechanisms for communicating with another device or system via a network.

As described in detail herein, the entity depicted in FIG. 4 may perform certain operations in response to processing logic 420 executing software instructions contained in a computer-readable medium, such as main memory 430. A computer-readable medium may be defined as a physical or logical memory device and/or carrier wave. The software instructions may be read into main memory 430 from another computer-readable medium, such as storage device 450, or from another device via communication interface 480. The software instructions contained in main memory 430 may cause processing logic 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of the entity, in other implementations, the entity may contain fewer, different, or additional components than depicted in FIG. 4. In still other implementations, one or more components of the entity may perform one or more tasks described as being performed by one or more other components of the entity.

Exemplary Parallel Programming Construct

FIG. 5 illustrates an exemplary parallel programming construct (e.g., SPMD command 500) capable of being analyzed and transformed to parallel program portions by analysis logic 320 of parallel programming interface 130. As shown, SPMD command 500 may be created with TCE 200 and provided to analysis logic 320 of client 300. In other implementations, SPMD command 500 may be created by another device and/or may be provided to analysis logic 320 of client 300. In one example, analysis logic 320 may implement SPMD command 500 to generate program portions 350-1, 350-2, 350-3, and/or 350-4.

SPMD command 500 may permit users to enter into a SPMD mode. In one implementation, SPMD command 500 may support data parallelism where a large amount of data may be distributed across multiple software UEs (e.g., software UEs 220 and/or labs 230) via a distributed arrays API. Operations on the distributed arrays may be coordinated through communication between labs 230 that own pieces of the array. The general form of SPMD command 500 may include:

SPMD, statement, . . . , statement, END.

The "statements" in the body of SPMD command 500 may be executed on resources (e.g., software UEs 220 and/or labs 230) that may be defined by a default configuration. SPMD command 500 may configure these resources as a communicating ring of labs (e.g., ring of labs 230), which may mean that labs 230 may have a same number of labs (e.g., NUMLABS) 510 defined, each lab 230 may have a unique value (e.g., LABINDEX 520, 530, 540, and 550 for labs 230-1, 230-2, 230-3, 230-4, respectively) between one and NUMLABS 510, labs 230 may send data to and from one another via communication channel 560, and/or each lab 230 may include a unique random number generator that creates random number streams independent of one another.

Upon completion of SPMD command 500, labs 230 may be "cleaned up," which may mean that labs 230 may be restored to ordinary resources (e.g., after the results are received), NUMLABS 510 and LABINDEX 520-550 may set back to one (or another value), the random number generators may be set back to a default start value, and/or workspaces may be cleared. There may be no implicit data transfer to and from the workspace where SPMD command 500 is called and the workspaces of labs 230 executing the body of SPMD command 500. An error on any of labs 230 executing the body of SPMD command 500 may cause an error in SPMD command 500. A warning on any of labs 230 executing the body of SPMD command 500 may be displayed on a device (e.g., client 300).

SPMD command 500 of the form SPMD NUMWORKERS, statement, . . . , statement, END may execute SPMD command 500 on an anonymous group of a number (e.g., NUMWORKERS) of resources provided within a default resource pool. SPMD command 500 of the form SPMD MYWORKERS, statement, . . . , statement, END may execute SPMD command 500 on a specified group of resources (e.g., MYWORKERS).

The syntax [OUT1,OUT2, . . . ]=SPMD(IN1,IN2, . . . ), statement, . . . , statement, END may transfer variables (e.g., IN1, IN2, . . . ) from client 300 to workspaces of labs 230 at the beginning of SPMD command 500, and may transfer variables (e.g., OUT1, OUT2, . . . ) from one of the workspaces back to client 300 at the end of SPMD command 500. If the variable being transferred from client 300 to labs 230 is a distributed array (e.g., a "darray"), then the variable may be automatically re-distributed to all labs 230. If the variable being transferred from client 300 is a non-distributed array, then the variable may be replicated on all labs 230. If the variable being transferred from labs 230 to client 300 is a replicated array, then a replicated value may be received from any of labs 230. If the variable being transferred from labs 230 to client 300 is a variant array, then a value may be received from one of labs 230. If the variable being transferred from labs 230 to client 300 is a distributed array, then the variable may be automatically re-distributed to be a distributed array over a single lab 230.

In one implementation, SPMD command 500 (and its associated syntax) may be implemented via client 300 (e.g. via analysis logic 320 of client 300), software UEs 220 (including labs 230), and/or TCE 200. In other implementations, SPMD command 500 (and its associated syntax) may be implemented via other software and hardware logic. SPMD command 500 may increase processing performance by dividing large data sets into pieces, and by providing each piece to different resources. Each resource may execute the same program on its piece of data, and the results may be collected.

Although FIG. 5 shows an exemplary parallel programming construct, in other implementations, client 300 may contain fewer, different, or additional parallel programming constructs than depicted in FIG. 5. In still other implementations, the exemplary parallel programming construct may be allocated in other ways than depicted in FIG. 5.

Exemplary Functional Diagram of Parallel Profiler Logic

Figure 6:
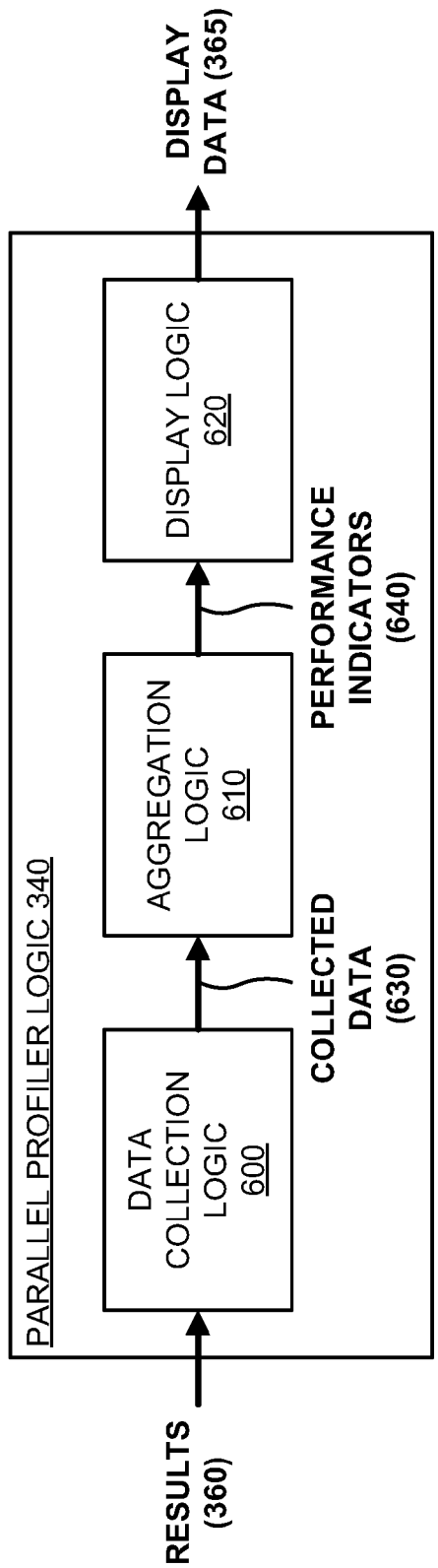
FIG. 6 depicts an exemplary diagram of functional components of parallel profiler logic depicted in FIGS. 3A-3C.

FIG. 6 is an exemplary diagram of exemplary functional components of parallel profiler logic 340. As illustrated, parallel profiler logic 340 may include a variety of functional components that may be implemented in hardware-based logic, software-based logic, a combination of hardware and software based logic, etc. For example, parallel profiler logic 340 may include data collection logic 600, aggregation logic 610, and/or display logic 620.

Data collection logic 600 may receive results 360 from execution of program portions 350 by, for example, the software UEs, and/or may collect data 630 from results 360 that may permit investigation and/or optimization of the performance of main program 345. Within main program 345, various message-passing communication primitives may be used that send and/or receive data between the software UEs (e.g., software UE 220) and/or labs 230 executing main program 345 in parallel. In one implementation, data collection logic 600 may collect an amount of sent data, an amount of received data, total communication time, time wasted in communication (e.g., time spent in a call to receive data before a sender is ready to send the data), time-based statistics (e.g., execution time, communication time) for each function and/or each line of code (e.g., of main program 345) executed by each lab 230, message passing information, etc. Each of labs 230 may independently collect such information, and/or data collection logic 600 may receive the information collected by labs 230 (e.g., globally and/or dependent upon a source or destination process). In other implementations, data collection logic 600 may collect other non-time-based statistics (e.g., non-execution of a line of code and/or a function) based on results 360. Data collection logic 600 may provide collected data 630 to aggregation logic 610.

Aggregation logic 610 may receive collected data 630 from data collection logic 600, and/or may aggregate collected data 630 to generate performance indicators 640 (e.g., for execution of main program 345) on a line-by-line basis and/or a function-by-function basis. For example, in one implementation, aggregation logic 610 may generate a ratio of computation time to communication time for a given function, may highlight lines within main program 345 where the most time is wasted (e.g., time wasted for synchronization), may generate a communication pattern of the amount of data sent and/or received by each process of a function, may calculate a total time to execute a function and/or line of main program 345, may calculate wasted communication time of a function and/or line of main program 345, may generate an active communication time of a function and/or line of main program 345, may determine functions and/or lines of main program 345 that did not execute, etc. Aggregation logic 610 may provide performance indicators 640 to display logic 620.

Display logic 620 may receive performance indicators 640 from aggregation logic 610, and/or may generate display data 365 (e.g., based on performance indicators) for display to a user (e.g., via a user interface). The user interface may include a graphical user interface (GUI) or a non-graphical user interface, such as a text-based interface. The user interface may provide display data 365 to users (e.g., users of client 300 and/or web service 370) via a customized interface (e.g., a proprietary interface) and/or other types of interfaces (e.g., a browser-based interface). The user interface may receive user inputs via one or more input devices (e.g., input device 460), may be user configurable (e.g., a user may change the size of the user interface, information displayed in the user interface, color schemes used by the user interface, positions of text, images, icons, windows, etc., in the user interface, etc.), and/or may not be user configurable. The user interface may be displayed to a user via one or more output devices (e.g., output device 470). Exemplary user interfaces are described below in connection with FIGS. 7-11.

Collected data 630 generated by a parallel program (e.g., main program 345) may be complex, and display logic 620

(e.g., in cooperation with aggregation logic 610) may simplify the presentation of display data 365 so that a user may quickly identify a problem(s) with main program 345 and/or a location(s) of the problem(s). Knowing that execution of main program 345 took an unexpected amount of time may provide an indication of where the problem(s) is occurring in main program 345. In one implementation, display logic 620 may enable a user to select one or more labs 230 that executed main program 345, and/or may display (e.g., via display data 365) a comparative view of lines of main program 345 where the most time is spent (e.g., by one or more labs 230). For example, display logic 620 may display lines of main program 345 that had the greatest differential in execution time (e.g., because one lab 230 took a longer time to execute the line than another lab 230, because one lab 230 failed to execute the line, etc.).

In another implementation, display logic 620 may display (e.g., via display data 365) previously executed lines of main program 345 that may have caused a delay in a current line of main program 345 (e.g., a line of main program 345 where significant time is spent by labs 230). Display logic 620 may use data from all labs 230 selected by the user to generate plots indicating lines of main program 345 where there is a significant difference in execution time, if the execution time of the lines of main program 345 executed on a reference lab 230 and comparison labs 230 are the same. In other implementations, display logic 620 may enable a user to sort and/or select display data 365 based on any of performance indicators 640 (e.g., communication time, wasted time, etc.).

In still other implementations, display logic 620 may display (e.g., via display data 365) any of performance indicators 640 generated by aggregation logic 610. For example, display logic 620 may display a ratio of computation time to communication time for a given function, may highlight lines within main program 345 where the most time is wasted (e.g., time wasted for synchronization), a communication pattern of the amount of data sent and/or received by each process of a function, a total time to execute a function and/or line of main program 345, wasted communication time of a function and/or line of main program 345, an active communication time of a function and/or line of main program 345, functions and/or lines of main program 345 that did not execute, etc.

Although FIG. 6 shows exemplary functional components of parallel profiler logic 340, in other implementations, parallel profiler logic 340 may contain fewer, different, or additional functional components than depicted in FIG. 6. In still other implementations, one or more functional components of parallel profiler logic 340 may perform one or more tasks described as being performed by one or more other functional components of parallel profiler logic 340.

Exemplary User Interfaces

FIGS. 7-11 illustrate exemplary user interfaces 700-1100, respectively, capable of being generated by parallel profiler logic 340 (e.g., via display logic 620). User interfaces 700-1100 may depict an exemplary line-by-line comparative view of two or more selectable computer nodes (e.g., labs 230) executing a SPMD program. In one implementation, the computer nodes may be automatically or manually selected (e.g., by the user). Parallel profiler logic 340 may calculate, for each selected lab 230, a predetermined number of lines (e.g., top lines) of code (e.g., main program 345) where the most time is spent (or may calculate another statistic). Parallel profiler logic 340 may merge and/or display the top lines of code even if some of the lines of code are different. Parallel profiler logic 340 may highlight and/or display the lines of code that took much longer to execute and/or are not contained within the top lines of code. In a balanced SPMD program running on identical hardware (e.g., processors), it may be assumed that the top lines per function where the most time is spent would be the same. Parallel profiler logic 340 may enable any situation significantly different than this scenario to be quickly identified (e.g., by identifying lines of code where main program 345 is having problems). Parallel profiler logic 340 may enable selection and/or display, for comparison, labs 230 that took the most execution time (e.g., per function call) and labs 230 that took the least execution time.

As illustrated in FIG. 7, user interface 700 may display a comparison of two labs (e.g., node processes) running an algorithm. In one implementation, user interface 700 may include a lab/line number field 705, a code field 710, a calls field 715, a total time field 720, a bytes sent field 725, a bytes received field 730, a wasted communication time field 735, an active communication time field 740, a percent time field 745, and/or a time plot field 750.

Lab/line field 705 may provide the number of a lab executing the code contained in code field 710, and/or may provide a line number of the code contained in code field 710. For example, a first record 755 may indicate that lab number "2" is executing the code (e.g., "[z, rnorm]=cgit(A, x);") provided in code field 710, and that the code provided in code field 710 corresponds to line "35" of the entire code (e.g., main program 345).

Code field 710 may provide a portion (e.g., a line) of code (e.g., main program 345) that has been executed. For example, first record 755 may indicate that the line (e.g., line "35") of code may include a certain syntax (e.g., "[z, rnorm]= cgit(A, x);").

A calls field 715 may provide a number of calls of the code contained in code field 710 by the lab identified in lab/line field 705, and/or may provide a comparative number of calls of the same code by another lab (e.g., not identified in lab/line field 705). For example, first record 755 may indicate that lab "2" made fifteen calls (e.g., as shown in calls field 715) of the code (e.g., "[z, rnorm]=cgit(A, x);") contained in code field 710, and that the comparative lab made fifteen calls (e.g., as shown in calls field 715) of the same code contained in code field 710.

Total time field 720 may provide a time spent executing the code contained in code field 710 by the lab identified in lab/line field 705, and/or may provide a comparative time spent executing the same code by another lab (e.g., not identified in lab/line field 705). For example, first record 755 may indicate that lab "2" spent "3.017" seconds (e.g., as shown in total time field 720) executing the code (e.g., "[z, rnorm]=cgit (A, x);") contained in code field 710, and that the comparative lab spent "3.022" seconds (e.g., as shown in total time field 720) executing the same code contained in code field 710.

Bytes sent field 725 may provide a number of bytes of information sent by the lab identified in lab/line field 705 during execution of the code contained in code field 710, and/or may provide a comparative number of bytes of information sent by another lab (e.g., not identified in lab/line field 705) during execution of the same code contained in code field 710. For example, first record 755 may indicate that lab "2" sent "13143.75 Kb" of information (as shown in bytes sent field 725) during execution of the code (e.g., "[z, rnorm] =cgit(A, x);") contained in code field 710, and that the comparative lab sent "13142.75 Kb" of information (e.g., as shown in bytes sent field 725) during execution of the same code contained in code field 710.

Bytes received field 730 may provide a number of bytes of information received by the lab identified in lab/line field 705 during execution of the code contained in code field 710, and/or may provide a comparative number of bytes of information received by another lab (e.g., not identified in lab/line field 705) during execution of the same code contained in code field 710. For example, first record 755 may indicate that lab "2" received "13143.75 Kb" of information (as shown in bytes received field 730) during execution of the code (e.g., "[z, rnorm]=cgit(A, x);") contained in code field 710, and that the comparative lab received "13142.75 Kb" of information (e.g., as shown in bytes received field 730) during execution of the same code contained in code field 710.

Wasted communication time field 735 may provide a time spent waiting for communications (e.g., a lab waiting to receive information, waiting to send information, etc.) during execution of the code contained in code field 710 by the lab identified in lab/line field 705, and/or may provide a comparative time spent waiting for communications during execution of the same code by another lab (e.g., not identified in lab/line field 705). For example, first record 755 may indicate that lab "2" spent "0.310" seconds (e.g., as shown in field 735) waiting for communications during execution of the code (e.g., "[z, rnorm]=cgit(A, x);") contained in code field 710, and that the comparative lab waited "0.309" seconds (e.g., as shown in field 735) waiting for communications during execution of the same code contained in code field 710.

Active communication time field 740 may provide a time spent for active communications (e.g., a lab receiving information, sending information, etc.) during execution of the code contained in code field 710 by the lab identified in lab/line field 705, and/or may provide a comparative time spent for active communications during execution of the same code by another lab (e.g., not identified in lab/line field 705). For example, first record 755 may indicate that lab "2" spent "0.136" seconds (e.g., as shown in field 740) for active communications during execution of the code (e.g., "[z, rnorm]=cgit(A, x);") contained in code field 710, and that the comparative lab spent "0.136" seconds (e.g., as shown in field 740) for active communications during execution of the same code contained in code field 710.

Percent time field 745 may provide a percentage of the time provided in total time field 720 (for each record) compared to a sum of the time provided in the "Totals" section of total time field 720 (for all records). For example, first record 755 may indicate that lab "2" spent "56.8%" (e.g., as shown in field 745) of the total time (e.g., "3.017" seconds divided by the total time of "5.313" seconds) during execution of the code (e.g., "[z, rnorm]=cgit(A, x);") contained in code field 710, and that the comparative lab spent "56.9%" (e.g., as shown in field 745) of the total time (e.g., "3.022" seconds divided by the total time of "5.313" seconds) during execution of the same code contained in code field 710.

Time plot field 750 may provide a graphical representation of the time provided in total time field 720. For example, first record 755 may indicate via a bar chart (e.g., as shown in time plot field 750) that the times provided in total time field 720 are almost the same (e.g., "3.017" seconds and "3.022" seconds).

User interface 700 may be generated automatically by display logic 620 of parallel profiler logic 340 using one or more criteria (e.g., a maximum time and/or a minimum time spent to execute a function of main program 345). In one implementation, user interface 700 may display a predetermined number (e.g., five lines are shown in FIG. 7) of the top executed lines of main program 345. As shown in FIG. 7, the top executed lines of main program 345 took roughly the same amount of time to execute (e.g., for lab "2" and a comparative lab), except for line number "25." For example, total time field 720 may indicate that lab "2" took "0.692 seconds" to execute line "25" of the code (e.g., "I=speye(n, n,darray);") contained in code field 710, and that a comparative lab spent "0.329 seconds" (e.g., as shown in total time field 720) executing line "25." A user may quickly determine from user interface 700 that one lab is waiting to execute line "25" of the code (e.g., "I=speye(n,n,darray);") contained in code field 710.

A user may sort the information displayed by user interface 700 based on any of fields 705-750. For example, if a user sorts the information based on wasted communication time field 735, user interface 800 depicted in FIG. 8 may be displayed to the user. As illustrated, user interface 800 may display, at the top, the lines of code (e.g., main program 345) that wasted the most communication time. User interface 800 include a variety of information, such as a lab/line number field 805, a code field 810, a calls field 815, a wasted communication time field 820, an active communication time field 825, a bytes sent field 830, a bytes received field 835, a total time field 840, a percent wasted communication time field 845, and/or a wasted communication time plot 850.

Lab/line number field 805 may provide similar information described above in connection with lab/line number field 805. Code field 810 may provide similar information described above in connection with code field 710. Calls field 815 may provide similar information described above in connection with calls field 715. Wasted communication time field 820 may provide similar information described above in connection with wasted communication time field 735. Active communication time field 825 may provide similar information described above in connection with active communication field 740. Bytes sent field 830 may provide similar information described above in connection with bytes sent field 725. Bytes received field 835 may provide similar information described above in connection with bytes received field 730. Total time field 840 may provide similar information described above in connection with total time field 720.

Percent wasted communication time field 845 may provide a percentage of time that is wasted on communications (e.g., as provided by wasted communication time field 820). For example, a first record 855 may indicate that lab "2" spent "46.0%" (e.g., as shown in field 845) of the time waiting for communications during execution of the code (e.g., "I=speye (n,n,darray);") contained in code field 810, and that a comparative lab spent "1.6%" (e.g., as shown in field 845) of the time waiting for communications during execution of the same code contained in code field 810.

Wasted communication time plot field 850 may provide a graphical representation of the time provided in wasted communication time field 820. For example, first record 855 may indicate via a bar chart or in another manner (e.g., as shown in wasted communication time plot field 850) that the times provided in wasted communication time field 820 are different (e.g., "0.344" seconds and "0.005" seconds).

As further shown in FIG. 8, user interface 800 may indicate that lab "2" had to wait a disproportionate amount of time (e.g., "0.344" seconds as indicated by field 820) waiting for communications than an amount of time (e.g., "0.005" seconds as indicated by field 820) spent by a comparative lab. Such an arrangement may enable a user to quickly determine where a problem(s) is occurring in main program 345 (e.g., at line "25" of main program 345).

As illustrated in FIG. 9, user interface 900 may display lines of code (e.g., main program 345) where the most time is spent executing the code. For example, user interface 900 may include a variety of information, such as a lab/line number field 905, a code field 910, a calls field 915, a total time field 920, a bytes sent field 925, a bytes received field 930, a wasted communication time field 935, an active communication time field 940, a percent time field 945, and/or a time plot field 950.

Lab/line number field 905, code field 910, calls field 915, total time field 920, bytes sent field 925, bytes received field 930, wasted communication time field 935, active communication time field 940, percent time field 945, and/or time plot field 950 may provide similar information described above in connection with lab/line number field 705, code field 710, calls field 715, total time field 720, bytes sent field 725, bytes received field 730, wasted communication time field 735, active communication time field 740, percent time field 745, and/or time plot field 750, respectively. However, lab/line field 905 may provide an indication of a comparative lab (e.g., in parentheses) executing the code provided in code field 910. For example, records of user interface 900 may indicate that lab "1" and lab "3" are executing the code contained in code field 910.

As further shown in FIG. 9, user interface 900 may provide an initial indication of where a problem may be causing a program to run slowly in parallel. This may be accomplished by highlighting (e.g., with multiple colors) lines where there was a significant difference between the labs. First, a number (e.g., N) of the most time-consuming lines on each lab (e.g., the "top lines") may be selected. User interface 900 may display in the table a union of the top lines. An intersecting set of top lines (i.e., lines that may consume time on both labs) may not be highlighted. Differences between the top lines sets may be highlighted (e.g., via two different colors). A first highlighted group 955 may display lines from the comparison that may be in the top lines set for a lab, but may not be in the top lines set for a main lab. A second highlighted group 960 may display lines that may be in the top lines set for the comparison lab, but may not be in the main lab. Such a rank-based comparison may show any code that took significantly longer on one lab as a proportion of total execution time, even if the two labs are not of the same computing performance.

As illustrated in FIG. 10, user interface 1000 may display information associated with a portion of and/or the full version of the code (e.g., main program 345), and/or other communication information, versus time (e.g., in milliseconds). For example, user interface 1000 may include a bytes sent indicator 1010, a bytes received indicator 1020, a header indicator 1030, and/or a barrier indicator 1040.

Bytes sent indicator 1010 may provide a visual indication (e.g., a bar graph) of how much time is spent sending bytes of information during execution of the line(s) of code. Bytes received indicator 1020 may provide a visual indication (e.g., a bar graph) of how much time is spent receiving bytes of information during execution by a lab. Header indicator 1030 may provide a visual indication (e.g., a bar graph) of how much time is spent executing a portion (e.g., a header portion) by the lab(s). A header portion may provide an indication of synchronization problems associated with the code. Each message may be sent as a header and a payload, and the header may contain little data. Any time taken by a receiver to receive the header may be wasted since the receiver may start receiving before a sender is ready to send. A barrier indicator 1040 may provide a visual indication (e.g., a bar graph) of how much time is spent executing another portion (e.g., a barrier portion) by the lab(s).

As further shown in FIG. 10, user interface 1000 may include lines 1050 showing a synchronization problem associated with the code displayed in user interface 1000. For example, if the code displayed in user interface 1000 is properly synchronized, lines 1050 may be vertically aligned.

As illustrated in FIG. 11, user interface 1100 may provide information associated with the code generating the information provided by user interfaces 700-1000. For example, user interface 1100 may include a coverage results section 1110 and/or a function code listing section 1120.

Coverage results section 1110 may include a variety of information associated with the code. In one implementation, for example, coverage results section 1110 may provide a total number of lines of the function associated with the code (e.g., "39" lines of code), a number of non-code lines, such as blank lines and/or comments (e.g., "14" non-code lines), a number of code lines that may be executed (e.g., "25" executable code lines), a number of code lines that were executed (e.g., "17" executed code lines), a number of code lines that were not executed (e.g., "8" unexecuted code lines), and/or a percent coverage of the function (e.g., "68%" of the number of code lines that may be executed were actually executed).

Function code listing section 1120 may include a variety of information associated with the function associated with the code. For example, in one implementation, function code listing section 1120 may include a time field (e.g., indicating the execution time of a line of code), a calls field (e.g., indicating a number of calls of the line of code), a sent/received/wasted field (e.g., indicating the amount of information sent and/or received by the line of code, and/or time wasted during execution of the line of code), a line field (e.g., indicating a line of code), and/or actual lines of the function. In other implementations, function code listing section 1120 may include non-code lines 1130 (e.g., blank lines or comments of the code), executed code lines 1140 (e.g., lines of code that were executed), non-time consuming, unexecuted code lines 1150 (e.g., lines of code that were unexecuted but did not consume time), and/or time consuming, unexecuted code lines 1160 (e.g., lines of code that were unexecuted and consumed time). For example, time consuming, unexecuted code lines 1160 may indicate that line "8" of the code was unexecuted, sent "716" kilobytes of information, received "718" kilobytes of information, and wasted "0.214" seconds of time.

As further shown in FIG. 11, time consuming, unexecuted code lines 1160 may be highlighted by user interface 1100. This may enable a user to quickly identify lines of code where execution problems may be occurring. In other implementations, non-time consuming, unexecuted code lines 1150 may be highlighted to enable a user to quickly identify lines of code where execution problems may be occurring.

Although FIGS. 7-11 show exemplary information that may be provided by user interfaces 700-1100, in other implementations, user interfaces 700-1100 may contain fewer, different, or additional information than depicted in FIGS. 7-11.

Exemplary Process

Figure 12:
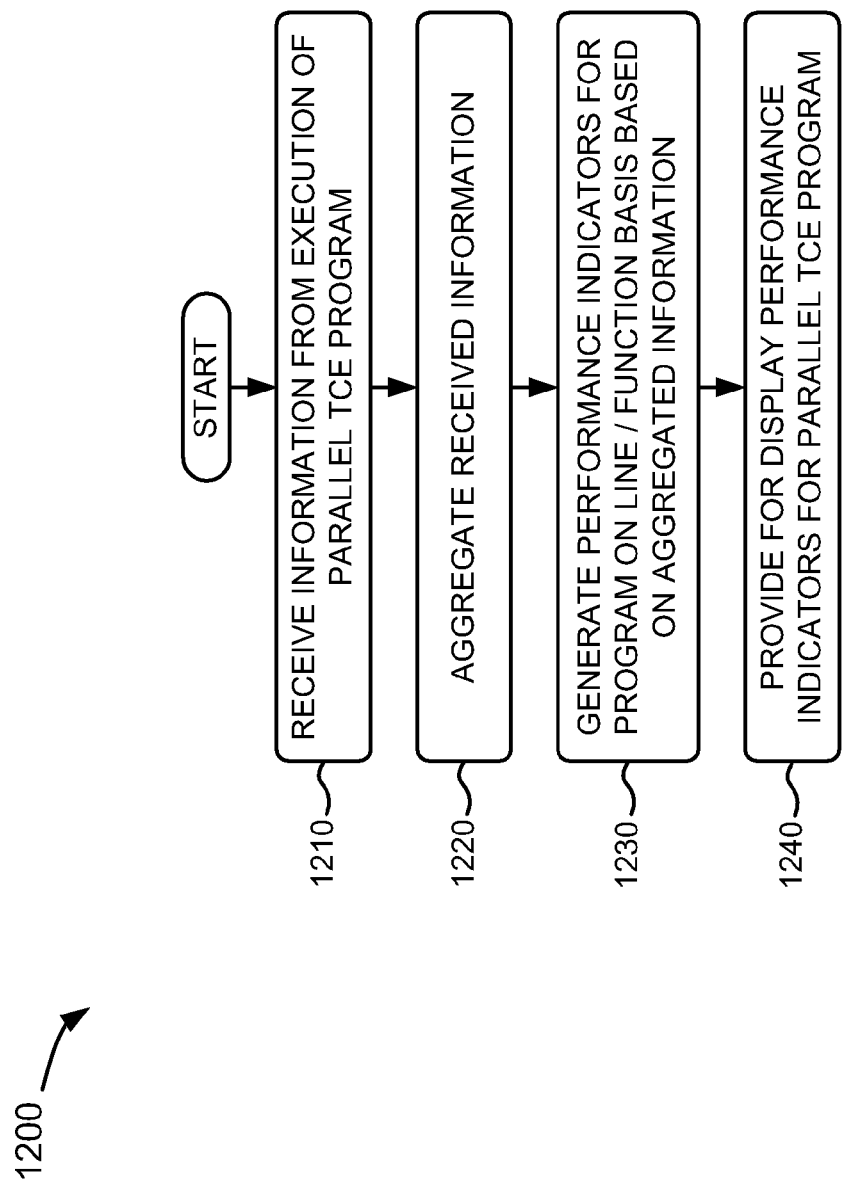
FIGS. 12-14 depict a flow chart of an exemplary process according to implementations described herein.
Figure 13:
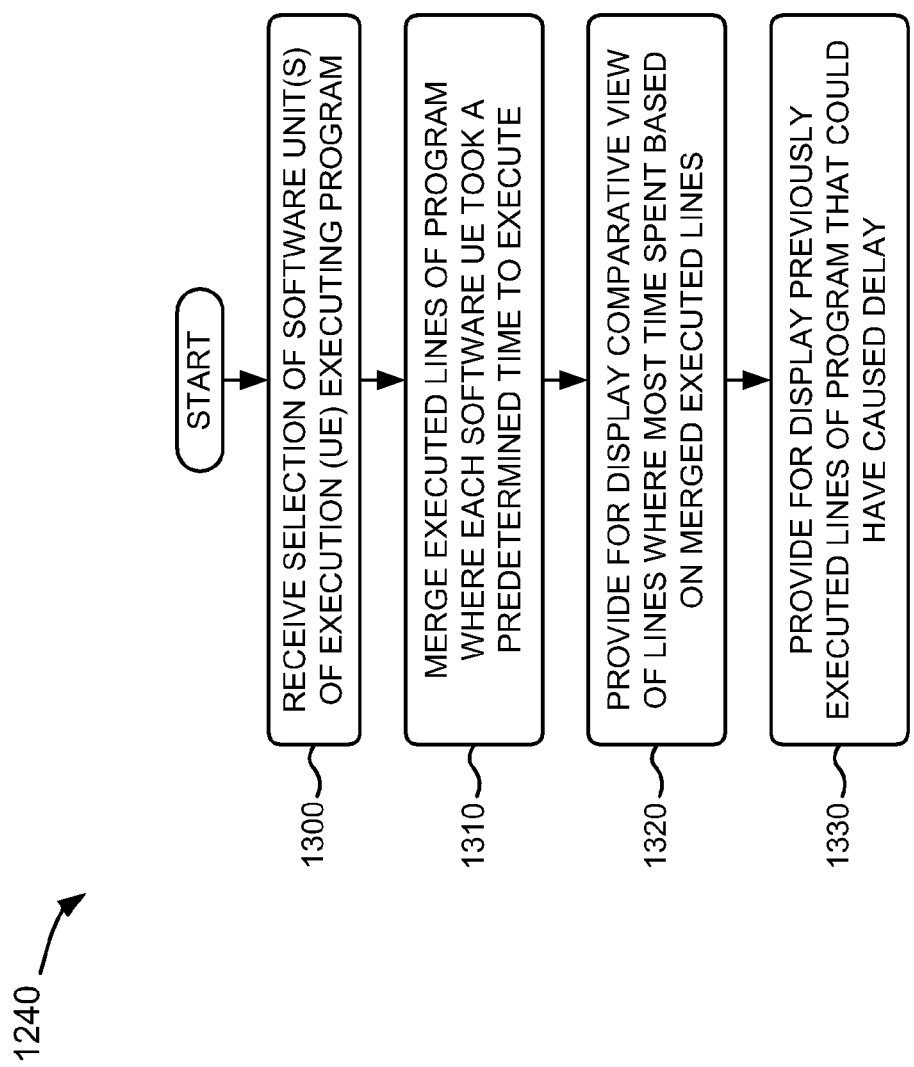
Figure 14:
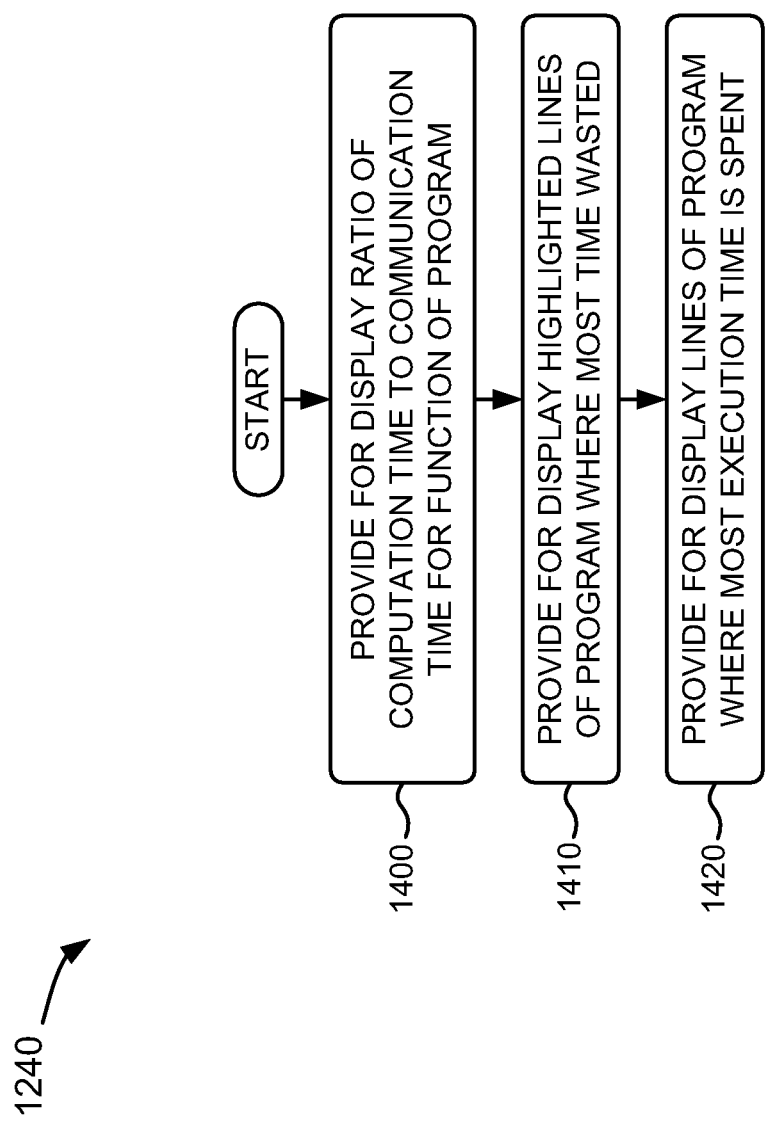

FIGS. 12-14 depict a flow chart of an exemplary process 1200 according to implementations described herein. In one implementation, process 1200 may be performed by client 300. In other implementations, process 1200 may be performed by other devices (e.g., client 300 in conjunction with web service 370).

As shown in FIG. 12, process 1200 may begin with receipt of information from execution of a parallel technical computing environment (TCE) program (block 1210). For example, in one implementation described above in connection with FIG. 6, data collection logic 600 of parallel profiler logic 340 (e.g., provided in client 300 and/or web service 370) may receive results 360 from execution of program portions 350 by the software UEs, and/or may collect data 630 from results 360 that may permit investigation and/or optimization of the performance of main program 345. In one example, data collection logic 600 may collect an amount of sent data, an amount of received data, total communication time, time wasted in communication (e.g., time spent in a call to receive data before a sender is ready to send the data), time-based statistics (e.g., execution time, communication time) for each function and/or each line of code (e.g., of main program 345) executed by each lab 230, message passing information, etc. Each of labs 230 may independently collect such information, and/or data collection logic 600 may receive the information collected by labs 230 (e.g., globally and/or dependent upon a source or destination process). In another example, data collection logic 600 may collect other non-time-based statistics (e.g., non-execution of a line of code and/or a function) based on results 360.

Returning to FIG. 12, the received information may be aggregated (block 1220), and/or one or more performance indicators may be generated for the parallel TCE program on a line and/or function basis and based on the aggregated information (block 1230). For example, in one implementation described above in connection with FIG. 6, aggregation logic 610 of parallel profiler logic 340 may receive collected data 630 from data collection logic 600, and/or may aggregate collected data 630 to generate performance indicators 640 (e.g., for execution of main program 345) on a line-by-line basis and/or a function-by-function basis.

As further shown in FIG. 12, the performance indicators for the parallel TCE program may be provided for display (block 1240). For example, in one implementation described above in connection with FIG. 6, display logic 620 of parallel profiler logic 340 may receive performance indicators 640 from aggregation logic 610, and/or may generate display data 365 (e.g., based on performance indicators) for display to a user (e.g., via a user interface). The user interface may include a graphical user interface (GUI) or a non-graphical user interface, such as a text-based interface. The user interface may provide display data 365 to users (e.g., users of client 300 and/or web service 370) via a customized interface (e.g., a proprietary interface) and/or other types of interfaces (e.g., a browser-based interface). The user interface may receive user inputs via one or more input devices (e.g., input device 460), may be user configurable (e.g., a user may change the size of the user interface, information displayed in the user interface, color schemes used by the user interface, positions of text, images, icons, windows, etc., in the user interface, etc.), and/or may not be user configurable. The user interface may be displayed to a user via one or more output devices (e.g., output device 470).

Process block 1240 may include the process blocks illustrated in FIG. 13. As shown in FIG. 13, process block 1240 may include receiving selection of one or more software units of execution (UE) executing the parallel TCE program (block 1300), and/or merging the executed lines of the parallel TCE program where each software UE may have taken a predetermined amount of time to execute (block 1310). For example, in one implementation described above in connection with FIG. 7-11, user interfaces 700-1100 may depict an exemplary line-by-line comparative view of two or more selectable computer nodes (e.g., labs 230) executing a SPMD program. In one example, the computer nodes may be automatically or manually selected (e.g., by the user). Parallel profiler logic 340 may calculate, for each selected lab 230, a predetermined number of lines (e.g., top lines) of code (e.g., main program 345) where the most time is spent (or may calculate another statistic). Parallel profiler logic 340 may merge and/or display the top lines of code even if some of the lines of code are different.

As further shown in FIG. 13, process block 1240 may include providing for display a comparative view of the lines of the parallel TCE program where the most execution time is spent (e.g., causing a delay) based on the merged executed lines (block 1320). For example, in one implementation described above in connection with FIG. 6, display logic 620 of parallel profiler logic 340 may enable a user to select one or more labs 230 that executed main program 345, and/or may display (e.g., via display data 365) a comparative view of lines of main program 345 where the most time is spent (e.g., by one or more labs 230). In one example, display logic 620 may display lines of main program 345 that had the greatest differential in execution time (e.g., because one lab 230 took a longer time to execute the line than another lab 230, because one lab 230 failed to execute the line, etc.).

Returning to FIG. 13, process block 1240 may include providing for display previously executed lines of the parallel TCE program that may have caused the delay (block 1330). For example, in one implementation described above in connection with FIG. 6, display logic 620 may display (e.g., via display data 365) previously executed lines of main program 345 that may have caused a delay in a current line of main program 345 (e.g., a line of main program 345 where significant time is spent by labs 230).

Alternatively and/or additionally, process block 1240 may include the process blocks illustrated in FIG. 14. As shown in FIG. 14, process block 1240 may include providing for display a ratio of a computation time to a communication time for a function of the parallel TCE program (block 1400), and/or providing for display highlighted lines of the parallel TCE program where the most time is wasted (block 1410). For example, in one implementation described above in connection with FIG. 6, display logic 620 of parallel profiler logic 340 may display a ratio of computation time to communication time for a given function of main program 345, and/or may highlight lines within main program 345 where the most time is wasted (e.g., time wasted for synchronization).

As further shown in FIG. 14, process block 1240 may include providing for display one or more lines of the parallel TCE program where the most execution time is spent (block 1420). For example, in one implementation described above in connection with FIGS. 7-11, parallel profiler logic 340 may calculate and/or display, for each selected lab 230, a predetermined number of lines (e.g., top lines) of code (e.g., main program 345) where the most time is spent during execution (or may calculate another statistic).

CONCLUSION

Implementations described herein may include a profiler for a parallel program that provides information for optimizing execution of the parallel program. For example, in one implementation, one or more portions of the parallel program may be dynamically allocated to one or more software UEs, and/or the one or more software UEs may be forwarded to one or more hardware UEs for execution. The parallel program profiler may receive information generated during execution of the parallel program, may aggregate the received information, and/or may generate performance indicators based on the aggregated information.

The foregoing description of implementations provides illustration and description, but is not intended to be exhaustive or to limit the invention to the precise form disclosed.

Modifications and variations are possible in light of the above teachings or may be acquired from practice of the invention.

For example, while a series of acts has been described with regard to FIGS. 12-14, the order of the acts may be modified in other implementations. Further, non-dependent acts may be performed in parallel.

Also, the term "user" has been used herein. The term "user" is intended to be broadly interpreted to include a client and/or web service or a user of a client and/or web service.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
    receiving information generated by execution of a parallel program by a technical computing environment (TCE), two or more units of execution (UEs) executing portions of the parallel program,
        the receiving being performed by the computing device;
    aggregating the received information,
        the aggregating being performed by the computing device;
    generating a plurality of performance indicators for the parallel program on one of a line basis or a function basis and based on the aggregated information,
        the generating being performed by the computing device;
    creating an array of information for each executed line of the parallel program executed by each of the two or more UEs,
        the creating being performed by the computing device; and
    providing, for display, a single interface that includes information regarding the plurality of performance indicators for each UE, of the two or more UEs, and a comparative view, based on the created array of information for each executed line, of a plurality of executed lines of the parallel program to a user,
        the providing being performed by the computing device,
        each executed line, of the plurality of executed lines of the parallel program, being associated with at least one of the plurality of performance indicators,
        each executed line, of the plurality of executed lines of the parallel program, including information associated with each of the two or more UEs, and
        each executed line being provided, for display, in a corresponding row of the single interface,
            a row including first information including
                two or more of the plurality of performance indicators and second information including two or more of the plurality of performance indicators,
                the first information being further associated with a first UE, of the two or more UEs, and
                the second information being further associated with a second UE, of the two or more UEs.

2. The computing device-implemented method of claim 1, where providing, for display, the single interface and the comparative view comprises:
    receiving a selection of the two or more UEs that execute the parallel program, where
    each UE takes a predetermined amount of time to execute, and
    the comparative view of the plurality of executed lines of the parallel program displays an amount of time spent during execution of each line of the plurality of executed lines of the parallel program.

3. The computing device-implemented method of claim 1, where providing, for display, the single interface further comprises:
    providing, for display in the single interface, executed lines of the parallel program occurring prior to the created array of information.

4. The computing device-implemented method of claim 1, where providing, for display, the single interface comprises one or more of:
    providing, for display, a ratio of computation time to communication time for one or more functions of the parallel program;
    providing, for display, highlighted lines of the parallel program where a greatest amount of time is wasted; or
    providing, for display, lines of the parallel program where a greatest amount of time is spent during execution.

5. A non-transitory computer-readable medium for storing instructions, the instructions comprising:
    one or more instructions which, when executed by at least one processor, cause the at least one processor to:
        receive information generated by execution of a parallel technical computing environment (TCE)-based program,
            two or more units of execution (UEs) executing portions of the parallel TCE-based program;
        generate a plurality of performance indicators for the parallel TCE-based program on one of a line basis or a function basis and based on the received information;
        create an array of information for each executed line of the parallel TCE-based program executed by each of the two or more UEs; and
        provide, for display, a single interface that includes information regarding the plurality of performance indicators for each UE and a comparative view, based on the created array of information for each executed line, of a plurality of executed lines of the parallel TCE-based program,
            each executed line, of the plurality of executed lines of the parallel program, being associated with at least one of the plurality of performance indicators, each executed line, of the plurality of executed lines of the parallel program, including information associated with each of the two or more UEs, and each executed line being provided, for display, in a corresponding row of the single interface, a row including first information including two or more of the plurality of performance indicators and second information including two or more of the plurality of performance indicators, the first information being further associated with a first UE, of the two or more UEs, and the second information being further associated with a second UE, of the two or more UEs.

6. The computer-readable medium of claim 5, where the one or more instructions further comprise:

one or more instructions to aggregate the received information.

7. The computer-readable medium of claim 5, where the one or more instructions further comprise:

one or more instructions to receive a selection of the two or more UEs that execute the parallel TCE-based program, where each UE takes a predetermined amount of time to execute, and the comparative view of the plurality of executed lines of the parallel TCE-based program displays an amount of time spent during execution of each line of the plurality of executed lines of the parallel program.

8. The computer-readable medium of claim 5, where the one or more instructions further comprise:

one or more instructions to provide, for display in the single interface, executed lines of the parallel TCE-based program occurring prior to the created array of information.

9. The computer-readable medium of claim 5, where the one or more instructions further comprise at least one of:

one or more instructions to provide, for display, a ratio of computation time to communication time for one or more functions of the parallel TCE-based program;

one or more instructions to provide, for display, highlighted lines of the parallel TCE-based program where a greatest amount of time is wasted; or one or more instructions to provide, for display, lines of the parallel TCE-based program where a greatest amount of time is spent during execution.

10. The computer-readable medium of claim 5, where the parallel TCE-based program comprises at least one of:

a parallel program created via a text-based environment;

a parallel program created via a graphically-based environment; or a parallel program created via a hybrid environment that includes a text-based environment and a graphically-based environment.

11. The computer-readable medium of claim 5, where the plurality of performance indicators comprise at least one of:

a ratio of computation time to communication time for a function of the parallel TCE-based program;

indicators of lines within the parallel TCE-based program where a greatest amount of time is wasted performing synchronization;

a communication pattern of data sent or received by each function of the parallel TCE-based program;

a total time to execute a function or line of the parallel TCE-based program;

wasted communication time of a function or line of the parallel TCE-based program;

an active communication time of a function or line of the parallel TCE-based program; or functions or lines of the parallel TCE-based program that were unexecuted.

12. The computer-readable medium of claim 5, where the one or more instructions further comprise:

one or more instructions to enable a user to sort lines of the parallel TCE-based program based on wasted communication time; and one or more instructions to provide, for display, the sorted lines of the parallel TCE-based program based on wasted communication time.

13. The computer-readable medium of claim 5, where the one or more instructions further comprise:

one or more instructions to provide, for display, coverage results for the parallel TCE-based program; and one or more instructions to provide, for display in the single interface, a code listing for the parallel TCE-based program.

14. The computer-readable medium of claim 13, where the coverage results comprise information identifying one or more of:

total lines of the parallel TCE-based program;

non-code lines of the parallel TCE-based program;

executable lines of the parallel TCE-based program;

executed lines of the parallel TCE-based program;

unexecuted lines of the parallel TCE-based program; or a ratio of the executed lines to the executable lines of the parallel TCE-based program.

15. The computer-readable medium of claim 13, where the code listing comprises information identifying one or more of:

an amount of time associated with each line of the parallel TCE-based program;

a number of calls associated with each line of the parallel TCE-based program;

an amount of data sent or received by each line of the parallel TCE-based program;

an amount of wasted time associated with each line of the parallel TCE-based program; or a listing of the lines of the parallel TCE-based program.

16. A system comprising:

one or more devices, comprised at least partially of hardware, to:

receive information generated by execution of a parallel program by a technical computing environment (TCE), two or more units of execution (UEs) executing portions of the parallel program, generate a plurality of performance indicators for the parallel program on one of a line basis or a function basis and based on the received information, create an array of information for each executed line of the parallel program executed by each of the two or more UEs; and provide a user interface that displays an interface that simultaneously includes information regarding the plurality of performance indicators for each UE and a comparative view, based on the created array of information for each executed line, of a plurality of executed lines of the parallel program, each executed line, of the plurality of executed lines of the parallel program, being associated with at least one of the plurality of performance indicators, each executed line, of the plurality of executed lines of the parallel program, including information associated with each of the two or more UEs, and each executed line being provided, for display, in a corresponding row of the interface, a row including first information including two or more of the plurality of performance indicators and second information including two or more of the plurality of performance indicators, the first information being further associated with a first UE, of the two or more UEs, and the second information being further associated with a second UE, of the two or more UEs.

17. The system of claim 16, where the one or more devices further:
aggregate the received information, and
generate the plurality of performance indicators based on the aggregate information.

18. The system of claim 16, where the parallel program comprises a parallel program created with a technical computing environment.

19. The system of claim 16, where the parallel program comprises a single program, multiple data (SPMD)-based program.

20. The system of claim 16, where the one or more devices further:
provide, for display, a ratio of computation time to communication time for one or more functions of the parallel program;
provide, for display, lines of the parallel program where a greatest amount of time is wasted; or
provide, for display, lines of the parallel program where a greatest amount of time is spent during execution.

21. The system of claim 16, where the plurality of performance indicators comprise at least one of:
a ratio of computation time to communication time for a function of the parallel program;
indicators of lines within the parallel program where a greatest amount of time is wasted performing synchronization;
a communication pattern of data sent or received by each function of the parallel program;
a total time to execute a function or line of the parallel program;
wasted communication time of a function or line of the parallel program;
an active communication time of a function or line of the parallel program; or
information identifying functions or lines of the parallel program that were executed.

22. The system of claim 16, where the one or more devices further:
provide, for display, coverage results for the parallel program; and
provide, for display, a code listing for the parallel program.

23. A device comprising:
a memory to store instructions; and
a processor to execute the instructions to:
receive information generated by execution of a parallel program by a technical computing environment (TCE),
two or more units of execution (UEs) executing portions of the parallel program;
aggregate the received information;
generate a plurality of performance indicators for the parallel program on one of a line basis or a function basis and based on the aggregated information;
create an array of information for each executed line of the parallel program executed by each of the two or more UEs; and
provide, for display, a single interface that includes information regarding the plurality of performance indicators for each UE and a comparative view, based on the created array of information for each executed line, of a plurality of executed lines of the parallel program to a user, each executed line, of the plurality of executed lines of the parallel program, being associated with at least one of the plurality of performance indicators, each executed line, of the plurality of executed lines of the parallel program, including information associated with each of the two or more UEs, and each executed line being provided, for display, in a corresponding row of the single interface, a row including first information including two or more of the plurality of performance indicators and second information including two or more of the plurality of performance indicators, the first information being further associated with a first UE, of the two or more UEs, and the second information being further associated with a second UE, of the two or more UEs.

24. The system device of claim 23, where the plurality of performance indicators comprise at least one of:
a ratio of computation time to communication time for a function of the parallel program;
indicators of lines within the parallel program where a greatest amount of time is wasted for synchronization;
a communication pattern of data sent or received by each function of the parallel program;
a total time to execute a function or line of the parallel program;
wasted communication time of a function or line of the parallel program;
an active communication time of a function or line of the parallel program; or
information identifying functions or lines of the parallel program that were executed.

25. The device of claim 23, where the processor is further to:
provide, for display, coverage results for the parallel program; and
provide, for display, a code listing for the parallel program.

* * * * *